US009805128B2

(12) United States Patent
Albert et al.

(10) Patent No.: US 9,805,128 B2
(45) Date of Patent: Oct. 31, 2017

(54) METHODS AND SYSTEMS FOR PREDICTING PSYCHOLOGICAL TYPES

(71) Applicant: XEROX CORPORATION, Norwalk, CT (US)

(72) Inventors: Prince Gerald Albert, Chennai (IN); Vivek Harikrishnan Ramalingam, Trichy (IN); Mohit Sorde, Maharashtra (IN); Saurabh Prabhat, Webster, NY (US)

(73) Assignee: Xerox Corporation, Norwalk, CT (US)

(*) Notice: Subject to any disclaimer, the term of this patent is extended or adjusted under 35 U.S.C. 154(b) by 373 days.

(21) Appl. No.: 14/624,925

(22) Filed: Feb. 18, 2015

(65) Prior Publication Data
US 2016/0239573 A1 Aug. 18, 2016

(51) Int. Cl.
*G06F 17/30* (2006.01)
*H04L 12/58* (2006.01)
*H04L 29/08* (2006.01)
*G06F 17/27* (2006.01)

(52) U.S. Cl.
CPC .... *G06F 17/30867* (2013.01); *G06F 17/2705* (2013.01); *G06F 17/277* (2013.01); *G06F 17/2785* (2013.01); *G06F 17/30312* (2013.01); *G06F 17/30377* (2013.01); *H04L 51/32* (2013.01); *H04L 67/22* (2013.01); *H04L 67/306* (2013.01)

(58) Field of Classification Search
CPC ................................................ G06F 17/3053
USPC ................................................ 707/736, 739
See application file for complete search history.

(56) References Cited

U.S. PATENT DOCUMENTS

| 8,719,302 B2 | 5/2014 | Bailey et al. |
| 2009/0248399 A1* | 10/2009 | Au ........................... G06F 17/27 704/9 |
| 2012/0246054 A1 | 9/2012 | Sastri |
| 2012/0284080 A1* | 11/2012 | De Oliveira ........... G06Q 10/04 705/7.29 |
| 2014/0095150 A1* | 4/2014 | Berjikly .............. G06F 17/2785 704/9 |
| 2014/0108006 A1 | 4/2014 | Vogel et al. |
| 2014/0122383 A1 | 5/2014 | Shen et al. |
| 2015/0012355 A1* | 1/2015 | Efrat .................. G06Q 30/0254 705/14.52 |
| 2015/0185993 A1* | 7/2015 | Wheatley .............. G06F 3/0484 715/744 |

FOREIGN PATENT DOCUMENTS

WO WO 2013160904 A1 10/2013

* cited by examiner

Primary Examiner — Hung T Vy

(57) ABSTRACT

According to embodiments illustrated herein there is provided a method for determining a psychological type of a user. The method includes determining a first score for the user based on a profile of the user on a social media platform. Further, a second score is determined for the user based on activities of the user on the social media platform. Thereafter, a third score is determined for the user based on context of conversations of the user on the social media platform, which is determined based on a part of speech of each word in the conversations using a context database. Each word is categorized based on at least the part of speech associated with the word. The third score is determined based on the categorization. The psychological type of the user is determined based on the first score, the second score, and the third score.

17 Claims, 7 Drawing Sheets

METHODS AND SYSTEMS FOR PREDICTING PSYCHOLOGICAL TYPES

TECHNICAL FIELD

The presently disclosed embodiments are related, in general, to social networking platforms. More particularly, the presently disclosed embodiments are related to methods and systems for predicting psychological types of users through social networking platforms.

BACKGROUND

Over the last decade, there has been a rising trend in predicting personality types of individuals. Various surveys and questionnaires may be conducted online to understand behavior and/or interests of individuals and accordingly a result of the personality type may be presented to the individuals. Such online surveys and questionnaires may be conducted by third parties and/or any party interested in seeking benefit from analyzing human behavior of a targeted audience.

Owing to the busy lifestyles that the targeted audience may have, it may not be possible for every individual to take the surveys and questionnaires. Further, the time constant nature of surveys and questionnaires may not provide a true insight of predicted personality types since the predicted personality types may change over a period of time. Accordingly, the existing solutions to predict personality types may be fallible.

SUMMARY

According to embodiments illustrated herein, there is provided a system for determining a psychological type of a user. The system includes one or more processors operable to determine a first score associated with the user based on a profile of the user on a social media platform. The one or more processors are further operable to determine a second score associated with the user based on one or more activities of the user on the social media platform. The one or more processors are further operable to determine a third score associated with the user based on context of one or more conversations of the user on the social media platform. The context of the keywords is determined by determining a part of speech associated with each word of a plurality of words in the one or more conversations based on a context database. Each word in the plurality of words in one or more categories is categorized based on at least the part of speech associated with each word, wherein the third score is determined based on the categorization. The one or more processors are further operable to determine the psychological type of the user based on the first score, the second score, and the third score.

According to embodiments illustrated herein, there is provided a method for determining a psychological type of a user. The method includes determining, by one or more processors, a first score associated with the user based on a profile of the user on a social media platform. The method further includes determining, by the one or more processors, a second score associated with the user based on one or more activities of the user on the social media platform. The method further includes determining, by the one or more processors, a third score associated with the user based on context of one or more conversations of the user on the social media platform. The context of the one or more conversations is determined by determining a part of speech associated with each word of a plurality of words in the one or more conversations based on a context database. Each word in the plurality of words is categorized in one or more categories based on at least the part of speech associated with each word. The third score is determined based on the categorization. The method further includes determining, by the one or more processors, the psychological type of the user based on the first score, the second score, and the third score.

According to embodiments illustrated herein, there is provided a method for identifying contextual human emotions from social data. The method includes receiving, by one or more processors, social data comprising one or more conversations of a user on a social media platform. The method further includes extracting, by the one or more processors, a plurality of words included in the one or more conversations. The method further includes determining, by the one or more processors, at least one part of speech associated with each word of the plurality of words in the one or more conversations based on a context database. The method further includes determining, by the one or more processors, context of one of the one or more conversations based on executing a function associated with determining at least one part of speech in the context database.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
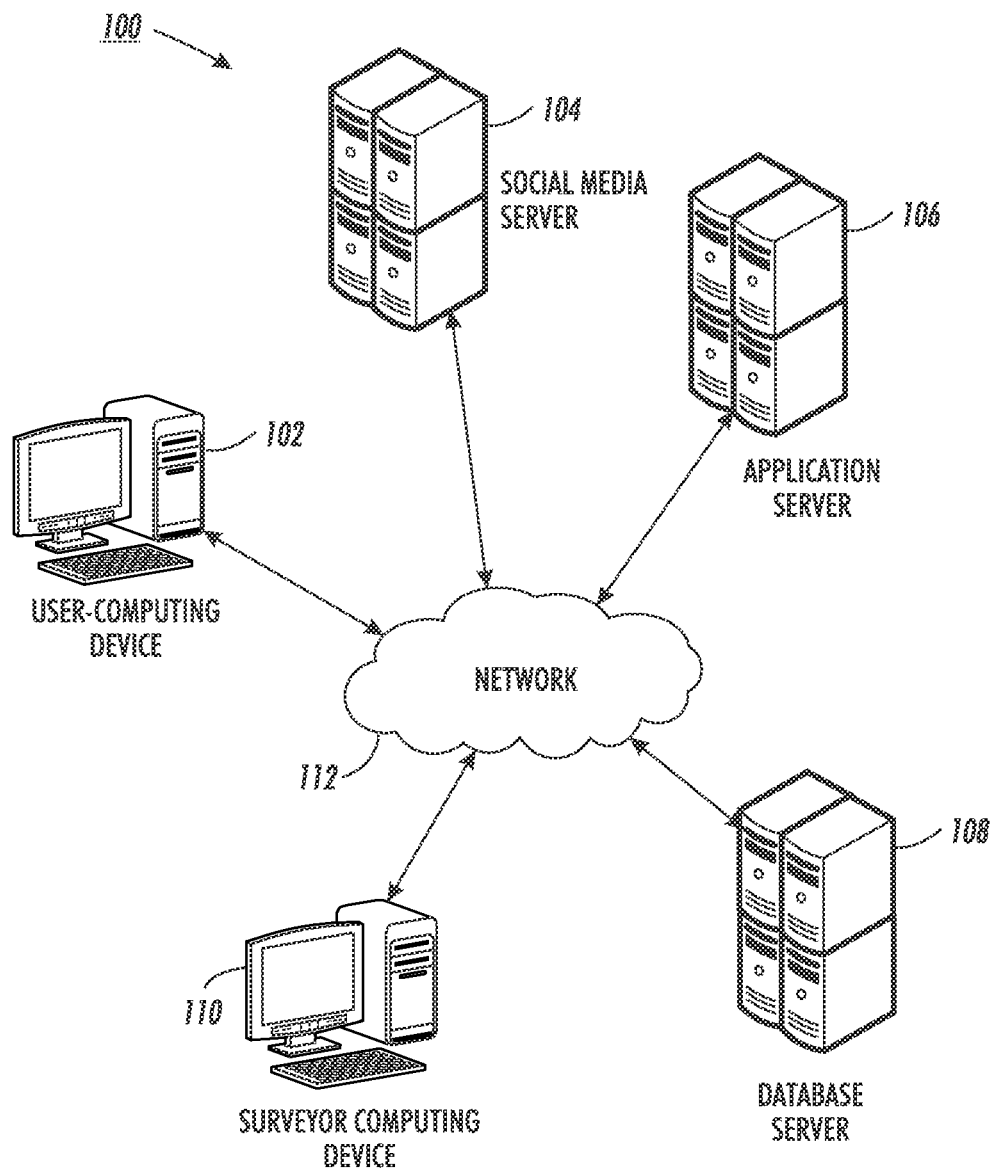
FIG. 1 is a block diagram illustrating a system environment in which various embodiments may be implemented.

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions

The following terms shall have, for the purposes of this application, the respective meanings set forth below.

A "social media platform" refers to one or more social networking websites and/or blogs. The social media platform includes free and/or paid social networking websites where one or more users register and interact with other users connected to the respective social networking websites. Examples of the social media platform may include, but are not limited to, Facebook™, Twitter™, LinkedIn™, Pinterest™, Instagram™, Youtube™, Tumblr™, Google Plus™, Flickr™, Vine™, Snapchat™, and the like. Owing to a plethora of electronic gadgets available to people, social networking popularity has reached a new level. Across the globe, people share photos, videos, moods, hobbies, knowledge, views, concerns, travel destinations, cooking recipes and the like through various social media platforms.

A "computing device" refers to a device that includes one or more processors/microcontrollers and/or any other electronic components, or a device or a system that performs one or more operations according to one or more programming instructions/codes. Examples of the computing device may include, but are not limited to, a desktop computer, a laptop, a personal digital assistant (PDA), a mobile device, a Smartphone, a tablet computer (e.g., iPad®, and Samsung Galaxy Tab®), and the like.

"Conversations" refer to one or more textual words that express thoughts, feelings, emotions, views, sentiments, moods, communication or provide information related to self or others or between two or more people. In an embodiment, conversations may include social media posts, newsfeed, status updates, chats, instant messages, audio messages, video messages, blogs, tweets, check-in at locations and the like on various social media platforms. In an embodiment, the conversations may further correspond to audio conversation between two or more users. In an embodiment, the conversations may further correspond to video conference between two or more users.

A "user profile" refers to a profile of a user on the social media platform. In an embodiment, a user may create a profile on the social media platform, such as Twitter, by filling one or more information fields related to the user, such as name, email address, description for self, and the like.

"First score" refers to a profile score of a user based on the user profile on various social media platforms.

"Second score" refers to a score determined for a user based on one or more activities of the user on the various social media platforms.

"Third score" refers to a score determined for a user based on a context of one or more conversations of the user on the various social media platforms.

"Attributes" refer to predetermined features defined for information available for a user on the social media platforms. In an embodiment, the attributes may be used for determining the various types of scores. For example, the profile attributes may be used for computing the first score. Similarly, the statistical attributes may be used for computing the second score. In an embodiment, a weightage may be applied to each of the attributes. Following table illustrates the weightages with corresponding notations and scores allocated to each of these weightages:

TABLE 1

Parameters for denoting weightages and corresponding scores

| Weightage | Notation | Score |
|---|---|---|
| Minimum | MIN | 1 |
| Below average | BA | 2 |
| Average | AVG | 3 |
| Above average | AA | 4 |
| Maximum | MAX | 5 |

A "personality trait" refers to qualities or characteristics possessed by individuals. The personality traits may depend on one or more actions performed by individuals in varied situations. However, the personality traits may change marginally over a period of time and are relatively stable. The personality trait may differ across individuals and may largely influence the behavior of an individual. One individual may possess more than one personality trait. For example, an individual may possess personality traits such as being passionate, practical, and kind.

A "psychological type" refers to one or more personality traits of individuals that correspond to predefined psychological types identified using indicators. In an embodiment, there may be four psychological types when Myers Briggs Type Indicator is adopted as an indicator for performing psychological assessment of individuals. The four psychological types may include Introvert (I), Extravert (E), Feeling (F), and Thinking (T). Such personality traits identified for the corresponding psychological types are exemplified below in Table 2.

TABLE 2

Personality traits of psychological types

| Introvert | Extravert | Feeling | Thinking |
|---|---|---|---|
| Private | Open | Gentle | Firm |
| Quiet | Outgoing | Sensitive | Just |
| Reserved | Talkative | Compassion | Foresight |
| Few Friends | Lots of friends | Warm | Objective |
| Reflective | Gregarious | Heart | Logical |
| Inward | Hearty | Feeling | Thinking |
| Privacy | Action | Touching | Convincing |
| Concentration | Outward | Blessings | Benefits |
| Few | People | Passionate | Criticize |
| Serious | Interaction | Sentimental | Analytical |

TABLE 2-continued

Personality traits of psychological types

| Introvert | Extravert | Feeling | Thinking |
|---|---|---|---|
| Bored | Many | Caring | Fair Minded |
| | Expressive | Kind | Practical |
| | Assertive | Tender | Strong Willed |
| | Flexible | Sympathize | Competent |
| | Fun | Devoted | Firm Minded |
| | Frank | Personal | Strength |
| | | People | Analyze |
| | | Subjective | Determined |
| | | Praise | Things |
| | | Understand | Head |
| | | Merciful | Distant |
| | | Love | Love |

It will be apparent to a person having ordinary skill in the art that an individual may be classified into various other psychological types with varied personality traits based on any other indicator or predetermined criteria.

A "context" refers to facts in a language that determine a way of interpreting one or more words in a text, a phrase, a sentence, or a conversation. The context may refer to implicit information being embedded in a text, a phrase, a sentence, or a conversation. In an embodiment, the context in one or more conversations may help or may be pivotal in extracting information such as a tense, an intensity, a direction of a human emotion expressed in a text, a phrase, a sentence, or a conversation. In an embodiment, the context may help in determining an intended sarcasm in a text, a phrase, a sentence, or a conversation. In an embodiment, a context emotion analysis may be conducted to determine the psychological type of the individuals. In an embodiment, the context emotion analysis may be conducted to examine mood swings exhibited by individuals.

A "Part of Speech" refers to one or more categories in which a word in a sentence may be categorized. In an embodiment, each such category may have an associated function that may be performed by a subject noun included in the sentence. In an embodiment, there are eight parts of speech in English Vocabulary. In another embodiment, there may be 10 parts of speech, out of which eight parts of speech correspond to parts of speech according to English Vocabulary and the remaining two correspond to negators and phrases. In an embodiment, the eight parts of speech include Pronoun, Verb, Adverb, Adjective, Preposition, Conjunction, Interjection, and Noun. In an embodiment, the negators correspond to words in a text, a phrase, a sentence, or a conversation that negate the Adverb or Adjective following it. In an embodiment, the Phrases correspond to words in a text, a phrase, a sentence, or a conversation that are associated with commonly used phrases and proverbs.

"Human emotions" refer to reactions that last for a short time, ranging from seconds to minutes. They may be elicited by sights, smells, sounds, and events in the external environment, or by thoughts and the internal representations of past or future events and experiences. Emotional traits may often be governed by the psychological type of a user. Human emotions are attached to the context expressed in one or more conversations or texts.

A "lexical database" refers to a database utilized to categorize human emotions. In an embodiment, the lexical database includes a plurality of words relating to human emotions. In an embodiment, Parrot's tree structured organization may be utilized to classify human emotions and serve as a lexical database. The Parrot's tree structured organization includes a three level hierarchy including primary, secondary and tertiary levels. The tertiary level includes largest elements in number and portrays the most detailed description of human emotions. The secondary level includes less detailed description than tertiary level but acts as a joining link between the tertiary and the primary level. The primary level includes five prime human emotions, namely, love, joy, fear, anger, and sadness. The Parrot's tree structured organization is efficient and beneficial in mapping a human emotion expressed at any level to a desired level based on exhaustive details provided for each level. Such a lexical database is exemplified in the table below:

TABLE 3

Parrott's tree structured organization and classification of human emotions

| Primary emotion | Secondary emotion | Tertiary emotion |
|---|---|---|
| Love | Affection | Adoration • Fondness • Liking • Attractiveness • Caring • Tenderness • Compassion • Sentimentality |
| | Lust/Sexual desire | Desire • Passion • Infatuation |
| | Longing | Longing |
| Joy | Cheerfulness | Amusement • Bliss • Gaiety • Glee • Jolliness • Joviality • Joy • Delight • Enjoyment • Gladness • Happiness • Jubilation • Elation • Satisfaction • Ecstasy • Euphoria |
| | Zest | Enthusiasm • Zeal • Excitement • Thrill • Exhilaration |
| | Contentment | Pleasure |
| | Pride | Triumph |
| | Optimism | Eagerness • Hope |
| | Enthrallment | Enthrallment • Rapture |
| Fear | Horror | Alarm • Shock • Fear • Fright • Horror • Terror • Panic • Hysteria • Mortification |
| | Nervousness | Anxiety • Suspense • Uneasiness • Apprehension (fear) • Worry • Distress • Dread |
| Anger | Irritability | Aggravation • Agitation • Annoyance • Grouchy • Grumpy • Crosspatch |
| | Exasperation | Frustration |
| | Rage | Anger • Outrage • Fury • Wrath • Hostility • Ferocity • Bitter • Hatred • Scorn • Spite • Vengefulness • Dislike • Resentment |
| | Disgust | Revulsion • Contempt • Loathing |
| | Envy | Jealousy |
| | Torment | Torment |
| Sadness | Suffering | Agony • Anguish • Hurt |
| | Sadness | Depression • Despair • Gloom • Glumness • Unhappy • Grief • Sorrow • Woe • Misery • Melancholy |
| | Disappointment | Dismay • Displeasure |
| | Shame | Guilt • Regret • Remorse |
| | Neglect | Alienation • Defeatism • Dejection • Embarrassment • Homesickness • Humiliation • Insecurity • Insult • Isolation • Loneliness • Rejection |
| | Sympathy | Pity • Sympathy |

"Sarcasm" refers to a human emotion in which an individual expresses his thoughts, feelings, or views with an intent to mock or scorn. For example, "I yawn when I am interested" may be considered as a sarcastic text. The details of identifying sarcasm in conversations will be explained later as a specific example in Tables 17A-17B.

A "plurality of look-up tables" refers to a data structure that may be used for interpreting the context in conversations. Some examples of lookup tables include Plutchik's wheel of emotions (illustrated in Table 4) and polarity of human emotion (illustrated in Table 5). Table 4 exemplifies opposite of a human emotion detected in the conversations. As per the Parrott's tree structured organization mentioned above, a primary emotion is outputted by referring to the lexical database. The Plutchik's wheel of emotions is utilized to infer the opposite nature of the outputted primary emotion. The Plutchik's wheel of emotions, in general, represents information about human emotions and its association with the color of the wheel in a graphic format. The intensity of the human emotion and the tone of the color increases towards the center of the wheel. Plutchik identified eight primary emotions, while secondary emotions are displayed as combinations of the primary emotions in the wheel. The Plutchik's wheel of emotions may be used to analyze text to identify a polarity of the human emotions. Therefore, a human emotion, opposite in nature to the outputted primary emotion from the Parrott's tree structured organization, is looked up from the look-up Table 3. Table 5 exemplifies a polarity of human emotion detected in the conversations. Each human emotion may be positive, negative, or neutral. Table 5 is constructed based on HUMAINE's (Human-Machine Interaction Network on Emotion) proposal for EARL (Emotion Annotation and Representation Language) and Parrott's tree structured organization. HUMAINE's proposal for EARL classifies 48 emotions. Therefore, the polarity of the detected human emotion in the conversations may be looked-up from the look-up Table 5.

TABLE 4

Tabulated using Plutchik's wheel of emotions and Parrott's tree structured emotions

| Primary emotion | Basic opposite |
|---|---|
| Love | Anger |
| Joy | Sadness |
| Surprise | (neutral) |
| Anger | Fear |
| Fear | Anger |
| Sadness | Joy |

TABLE 5

Tabulated using HUMAINE's proposal for EARL and Parrott's tree structured emotions

| Negative Emotions | Positive Emotions | Neutral Emotions |
|---|---|---|
| Anger, Annoyance, Contempt, Disgust, Irritation, Anxiety, Embarrassment, Fear, Helplessness, Powerlessness, Worry, Doubt, Envy, Frustration, Guilt, Shame, Boredom, Despair, Disappointment, Hurt, Sadness, Agitation, Stress, Shock, Tension | Amusement, Delight, Elation, Excitement, Happiness, Joy, Pleasure, Caring, Affection, Empathy, Friendliness, Love, Courage, Hope, Pride, Satisfaction, Trust, Calm, Content, Relaxed, Relieved, Serene, Politeness | Interest, Surprised |

A "context database" refers to a database that includes a plurality of parts of speech identified for one or more words in a text, a phrase, a sentence, or a conversation. Each part of speech in the context database is associated with a nature, a function, and subsets of the respective parts of speech. A detailed method of detecting a part of speech in a text, a phrase, a sentence, or a conversation, and relevance of detecting the part of speech in understanding the context will be explained later in disclosed embodiments in conjunction with Table 6. Table 6 comprises 4 columns, comprising set or parts of speech, nature of elements included in each set, function of the set, and subsets included in each set.

TABLE 6

Context Database

| SET OR PARTS OF SPEECH | NATURE | FUNCTION | SUBSETS |
|---|---|---|---|
| Pronoun | Finite and Static (74 elements) | Understanding the person being referred | First Person: I, we, me . . . Second Person: You, yourself . . . Third Person: It, he, they . . . |
| Verb | Finite but Expanding | Helping Verb: To understand the tense of the test statement; It is a finite and static set with 24 elements | Present: am, is, are, do, does . . . Past: was, were, did, had, has, have . . . Future: will, would, might . . . |
| | | Understanding the tense as well as the state; it is finite but expanding | The subsets are formed as per the tertiary emotions mentioned in Parrott's structure. Hence these are directly mapped to human emotions. Some of the tertiary emotion subsets are listed below. |

| | | | Elements | |
|---|---|---|---|---|
| | | Subset | Present/Future | Past |
| | | Grief | Cry, weep . . . | Cried, wept . . . |
| | | Happiness | Smile, laugh . . . | Smiled, laughed . . . |

TABLE 6-continued

Context Database

| SET OR PARTS OF SPEECH | NATURE | FUNCTION | SUBSETS | | | |
|---|---|---|---|---|---|---|
| | | | Hatred | Hate, dislike . . . | | Hated, disliked |
| Adverb | Finite but Expanding | Adverbs of Degree: To understand the degree of emotions expressed by adjectives and adverbs; It is finite and static | Degree 1 (default) 2 3 | Elements quite, just Almost, nearly, lesser, more Too, completely, very, extremely, superbly, most | | |
| | | Understanding the state of human emotion | The subset is directly related to tertiary human emotions. Some of the subsets are listed below. Subset Grief Happiness Hatred | Elements Sadly, bitterly . . . Happily, gleefully, . . . Arrogantly, annoyingly . . . | | |
| Adjective | Finite but Expanding | Understanding the state of human emotion if succeeding a verb; Else neglected | The subset is directly related to tertiary human emotions. Some of the subsets are listed below. Subset Grief Happiness Hatred | Degree 1 Sad, bitter, . . . Happy, glee, . . . Arrogant, annoying, . . . | Elements Degree 2 Sadder happier | Degree 3 saddest happiest |
| Preposition | Finite and Static (150 to be precise) | If the succeeding segment does not contain Verb, the word is a Preposition; Else a Conjunction; compare and match the segment with phrase | Aboard, about, above, across, after, against, along . . . | | | |
| Conjunction | Finite and Static | Flag the beginning of a new sentence | For, and, because, or, so, yet, neither . . . nor, either . . . or, not only . . . but also, although . . . | | | |
| Interjection | Finite and Static | Understanding the human emotion | The subset is directly related to tertiary human emotions. Some of the subsets are listed below. Subsets Grief Happiness Hatred | Elements Aah, geez . . . Hurray, yippee . . . Curse You, die . . . | | |
| Noun | Infinite | Can be neglected | It is a disjoint set to all the other sets | | | |
| Phrases | Finite but expanding | Understanding the human emotion | The subset is directly related to tertiary human emotions. Some of the subsets are listed below. Subsets Grief Happiness Hatred | Elements With heavy heart Over the moon Not on equal terms | | |
| Negators | Finite and static | Negating the tertiary emotion | No, never, used to, not, hardly, scarcely . . . | | | |

As exemplified, 10 discrete sets corresponding to the parts of speech are predefined in Table 6. Each of these sets have predefined functions and elements. Each set includes its own subsets in a hierarchical order. A union of all 10 sets is referred as "Universal Set" of the context database. Out of the 10 predefined sets, a group of sets are relevant to derive contextual information from the one or more conversations, while the remaining group of sets are relevant for interpreting the human emotions in the one or more conversations. For example, Pronouns are complimentary in understanding the context and Conjunctions assist in learning the continuity or discontinuity of a context. Therefore, Pronouns and Conjunctions correspond to group of sets that are relevant for understanding the context of the one or more conversations. Further, Verbs, Adverbs, Adjectives following Verbs, and certain Interjections are the parts of speech that resemble the human emotions in natural language and hence, correspond to group of sets relevant for interpreting the human emotions. In an embodiment, there may be sets that are not relevant for understanding the context or human emotions in the one or more conversations. Such sets may be neglected. For example, Nouns is a disjoint set to all other sets and can be neglected. Further, Prepositions and Adjectives (preceding or succeeding Nouns) can be neglected. Accordingly, each set, related to human emotion or context, is important in conducting psychological analysis or predicting a psychological type of an individual.

Each word of a plurality of words in the one or more conversations received from the social media platform is searched in the context database. A word that does not belong to any of the predefined sets is filtered off in the process. Once a word is matched and found in the context database, the function corresponding to the part of speech identified for that word is interpreted and executed. The detailed description of using the Table 6 in a process of predicting the psychological type of a user will be explained later in Table 15.

"One or more activities" refers to one or more actions performed by one or more users on the social media platforms such as, but not limited to, posting status updates, sharing articles, sharing images, liking posts of others, sharing posts of others, following one or more people, and the like.

"Statistical data" refers to numerical data available on the user profile on the social media platforms. For example, a number of followers/followings of a user on a social media platform, such as Twitter™, may correspond to statistical data associated with the user.

"One or more keywords" in a plurality of words in the one or more conversations refers to words that relate to human emotions. Such words may correspond to parts of speech in the context database that relate to the human emotion. For example, happiness is identified as a keyword from the one or more conversations.

FIG. 1 is a block diagram illustrating a system environment 100 in which various embodiments may be implemented. The system environment 100 includes a user-computing device 102, a social media server 104, an application server 106, a database server 108, a surveyor computing device 110, and a network 112. Various devices in the system environment 100 may be interconnected over the network 112. FIG. 1 shows, for simplicity, one user-computing device 102, one application server 106, one database server 108, and one surveyor computing device 110. However, it will be apparent to a person having ordinary skill in the art that the disclosed embodiments may also be implemented using multiple user-computing devices 102, multiple applications servers 106, multiple database servers 108, and multiple surveyor computing devices 110.

The user-computing device 102 refers to a computing device used by a user. The user-computing device 102 may comprise one or more processors in communication with one or more memories. The user-computing device 102 may be operable to execute one or more sets of instructions stored in the one or more memories. In an embodiment, the user-computing device 102 may be communicatively coupled with the network 112. In an embodiment, the user may utilize the user-computing device 102 to access user profiles on one or more social media platforms to/from the social media server 104 over the network 112. For example, a user may interact with one or more users using the user-computing device 102 when the user logs into a social networking website, such as Facebook™, hosted by the social media server 104. The user may register or create a user profile on Facebook™ using the user-computing device 102. The user may perform one or more activities on the social media platform using the user-computing device 102. The user-computing device 102 may include various types of computing devices such as, but not limited to, a desktop computer, a laptop, a personal digital assistant (PDA), a mobile device, a Smartphone, a tablet computer (e.g., iPad® and Samsung Galaxy Tab®), and the like.

The social media server 104 may refer to one or more computing devices that may receive and store information received from one or more user-computing devices 102, in accordance with at least one embodiment. The social media server 104 may comprise one or more computing devices networked together and may be linked to outside world through fiber optic cables. In an embodiment, the social media server 104 may store one or more instructions/information/features pertaining to one or more user profiles. In an embodiment, the social media server 104 may obtain the information pertaining to the one or more users from various other sources such as, but not limited to, other/different social networking websites, databases of various organizations that may provide the rightful authentication to access the information pertaining to the one or more users. The information pertaining to the one or more users may comprise, but is not limited to, name, age, qualification, professional details, and/or profile attributes. In an embodiment, the social media server 104 may be communicatively coupled with the network 112. In an embodiment, the social media server 104 may be configured to transmit or receive one or more instructions/information/features to/from one or more devices, such as the user-computing device 102, the application server 106, the database server 108, the surveyor computing device 110, etc., over the network 112. In an embodiment, the social media server 104 may receive a query from the application server 106, the database server 108, or the surveyor computing device 110 to retrieve the information pertaining to one or more users. For querying the social media server 104, one or more querying languages may be utilized such as, but are not limited to, SQL, QUEL, DMX and so forth. Further, the social media server 104 may be realized through various technologies such as, but not limited to, Microsoft® SQL server, Oracle, and My SQL.

The application server 106 may refer to a computing device or a software framework that may provide a generalized approach to create the application-server implementation. In an embodiment, the function of the application server 106 may be dedicated to the efficient execution of procedures such as, but not limited to, programs, routines, or scripts stored in one or more memories for supporting its applied applications. The application server 106 may be operable to host an application/tool/framework for determining psychological types of one or more users, based on information received from the social media server 104, in accordance with at least one embodiment. The psychological types of one or more users may be determined based on a plurality of scores computed using data received from the social media server 104. In an embodiment, the application server 106 may utilize different application program interfaces (API's) for building applications. There may be different API's for operating systems, applications or websites. In an embodiment, social media platforms may offer specific API's, such as Facebook™ API's and Twitter™ API's. Such API's may be utilized by the application server 106 to extract information of one or more users associated with one or more social media platforms. The application server 106 may be realized using various technologies such as, but not limited to, Java application server, .NET Framework, PHP, Base4 application server, and Appaserver. The application server 106 has been described later in conjunction with FIG. 2.

The database server 108 may refer to one or more computing devices that may store the context database, the lexical database, and the plurality of look-up tables. In an embodiment, the database server 108 may interact with the application server 106 to transmit data required by the application server 106 to host one or more applications. The data transmitted by the database server 108 may be utilized to understand the context of one or more conversations of one or more users on the social media platforms. In an embodiment, the database server 108 may extract data related to one or more users from the one or more user-computing devices 102 and/or the social media server 104. The database server 108 may be realized through an application server such as, but not limited to, Java application server, .NET framework, Base4 application server, and Appaserver.

A person skilled in the art would understand that the scope of the disclosure should not be limited to the social media server 104, the application server 106, or the database server 108 as a separate entity. In an embodiment, the functionalities of the social media server 104, the application server 106, and/or the database server 108 may be combined into a single server, without limiting the scope of the invention.

The surveyor computing device 110 may refer to a computing device used by a surveyor or one who conducts a survey/poll/test. In an embodiment, the surveyor computing device 110 may be communicatively coupled to the network 112. In an embodiment, the surveyor computing device 110 may send a request to the application server 106 to determine one or more psychological types of a target audience. In response to the received request, the application server 106 may host the application for determining one or more psychological types on the surveyor computing device 110 (e.g., through a web-based interface) over the network 112. In an embodiment, a surveyor may utilize the surveyor computing device 110 to offer one or more promotional offers/advertisements/marketing strategies/publicity strategies to the target audience via the social media platform over the network 112. The surveyor computing device 110 may include various types of computing devices such as, but not limited to, a desktop computer, a laptop, a personal digital assistant (PDA), a mobile device, a Smartphone, a tablet computer (e.g., iPad® and Samsung Galaxy Tab®), and the like.

The network 112 corresponds to a medium through which content may flow between one or more of, but not limited to, the user-computing device 102, the social media server 104, the application server 106, the database server 108, and/or the surveyor computing device 110. Examples of the network 112 may include, but are not limited to, a Wireless Fidelity (Wi-Fi) network, a Wide Area Network (WAN), a Local Area Network (LAN), or a Metropolitan Area Network (MAN). Various devices such as the user-computing device 102, the social media server 104, the application server 106, the database server 108, and/or the surveyor computing device 110 may connect to the network 112 in accordance with various wired and wireless communication protocols such as Transmission Control Protocol/Internet Protocol (TCP/IP), User Datagram Protocol (UDP), and 2G, 3G, or 4G communication protocols.

Figure 2:
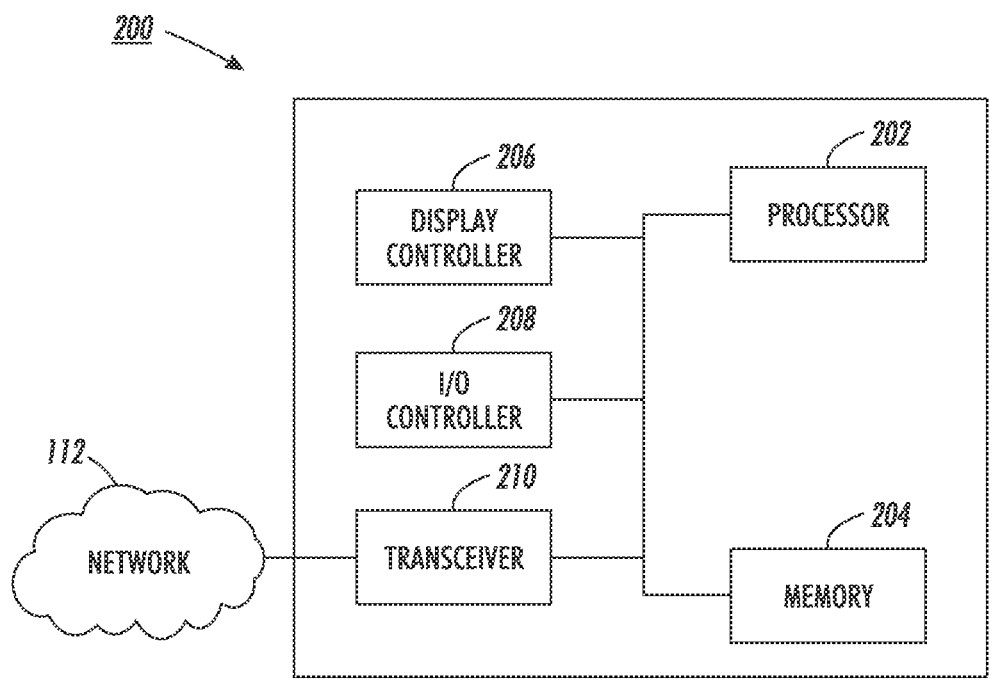
FIG. 2 is a block diagram illustrating a system for predicting a psychological type of a user, in accordance with at least one embodiment.

FIG. 2 is a block diagram illustrating a system 200 for determining a psychological type of a user, in accordance with at least one embodiment. In an embodiment, for the ongoing purpose, the system 200 has been considered as the application server 106. However, the scope of the disclosure is not limited to the system 200 as the application server 106. In an embodiment, the system 200 may be realized on any of the computing device such as social media server 104. The system 200 may comprise one or more processors, such as a processor 202, one or more memories, such as a memory 204, a display controller 206, an input/output (I/O) controller 208, and one or more transceivers, such as a transceiver 210.

The system 200 may correspond to the application server 106 without departing from the scope of the disclosure. For the purpose of the ongoing description, the system 200 has been considered as the application server 106.

The processor 202 may be configured to execute a set of instructions stored in the memory 204. The processor 202 may be coupled to the memory 204, the display controller 206, the I/O controller 208, and the transceiver 210. The processor 202 may execute a set of instructions/programs stored in the memory 204 to perform one or more operations. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store one or more sets of instructions and data. In an embodiment, the memory 204 may include a context database, a lexical database, and a plurality of look-up tables. In an embodiment, the context database, the lexical database and the plurality of look-up tables may be received from the database server 108. In an embodiment, the memory 204 may store one or more social media profiles of one or more users on the social media platform received through the social media server 104. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 enables the hardware of the system 200 to perform the predetermined operation.

The display controller 206 may be operable to control one or more display devices, such as the surveyor computing device 110. The display controller 206 may comprise suitable logic, circuitry, interfaces, and/or code that may be operable to generate audio and/or video signals for content being rendered on the surveyor computing device 110. In an embodiment, the display controller 206 may be a graphics-card and/or a graphics processing unit (GPU).

The I/O controller 208 may be operable to control one or more (I/O) devices. The I/O controller 208 may comprise various interfaces between the I/O devices and the processor 202. In an embodiment, the I/O controller 208 may be an add-on software or hardware, which allows connection of additional I/O devices to the surveyor computing device 110. The I/O controller 208 may be connected to a plurality of I/O devices. Examples of the input devices may include, but are not limited to, a keyboard, a mouse, a joystick, a touch screen, a microphone, a remote controller, and/or a camera. Examples of the output devices may include, but are not limited to, the surveyor computing device 110 and a speaker.

The transceiver 210 may be coupled to the network 112. The transceiver 210 may comprise suitable logic, circuitry, interfaces, and/or code that may be operable to communicate with the social media server 104 or the database server 108 or the surveyor computing device 110, via various communication interfaces. The transceiver 210 may implement known technologies for supporting wired or wireless communication with the network 112. Examples of the transceiver 210 may include, but are not limited to, an antenna, a radio frequency (RF) transceiver, one or more amplifiers, a tuner, one or more oscillators, a digital signal processor (DSP), a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use a plurality of communication standards, protocols and technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3:
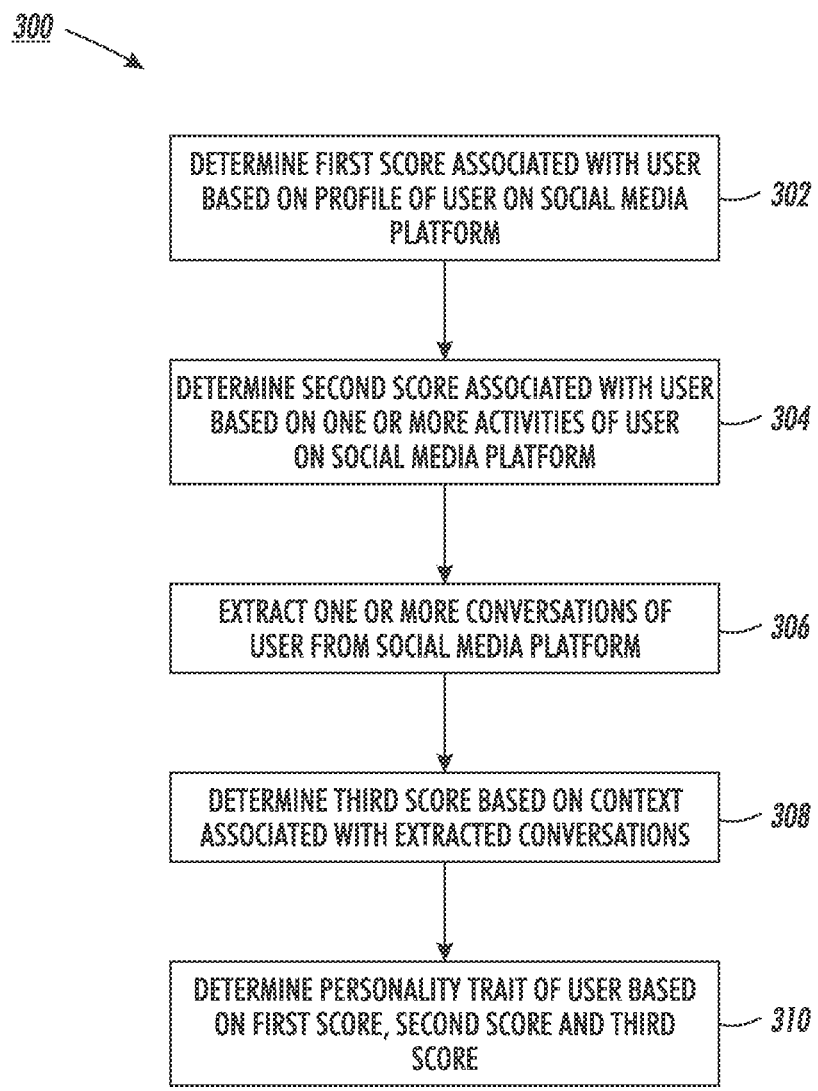
FIG. 3 is a flowchart illustrating a method for determining a psychological type of a user, in accordance with at least one embodiment.

FIG. 3 is a flowchart 300 illustrating a method for determining a psychological type of a user, in accordance with at least one embodiment. The flowchart 300 is described in conjunction with FIG. 1 and FIG. 2.

At step 302, a first score associated with a user is determined based on a user profile on a social media platform, such as Twitter™ or Facebook™. Prior to determining the first score, the surveyor associated with surveyor computing device 110 may want to determine the psychological type of a user. The surveyor computing device 110 may send a request to the application server 106. In an embodiment, the request may include details of at least one user for which the surveyor may want to determine the psychological type. Post receiving the request, the processor 202 may access the user profile of the user on one or more social media platforms. In an embodiment, the user may have created the user profile on the social media platform using the user-computing device 102. In an embodiment, the processor 202 may determine the first score by extracting data regarding user profile from the social media server 104. The details of computing the first score will be explained in description below with respect to Tables 7 and 8.

Table 7 comprises a plurality of attributes related to profile of a user on a social media platform. Such attributes may include but are not limited to, Profession, Colors, and Privacy Settings. These attributes are exemplified considering Twitter™ as the social media platform. However, different attributes on different social media platforms may be used without departing from the scope of the disclosed embodiments.

TABLE 7

Psychological types predicted as per characteristics identified for a plurality of profile attributes

| | Attributes | | Characteristics | Psychological type |
|---|---|---|---|---|
| User Profile | Profession | Overseer, Persuader, Supporter Entertainer, Chief, Advocate, Mentor, Originator | Open, Outgoing, Talkative, Action, Outward, People Interaction, Expressive, Assertive, Flexible | Extravert |
| | | Examiner, Defender, Craftsman, Artist, Strategist, Engineer, Confidant, Dreamer | Private, Quiet, Reserved, Reflective, Inward, Concentration | Introvert |
| | | Supporter, Defender, Entertainer, Artist, Mentor, Advocate, Dreamer, Confidant | Sensitive, Compassion, Feeling, Passionate, Sentimental, Caring, Kind, Tender, Devoted, Subjective, Praise, Understand, Merciful, Heart | Feeling |
| | | Overseer, Examiner, Persuader, Craftsman, | Firm, Foresight, Objective, Logical, Thinking, Convincing, | Thinking |

TABLE 7-continued

Psychological types predicted as per characteristics
identified for a plurality of profile attributes

| Attributes | | Characteristics | Psychological type |
|---|---|---|---|
| Colors | Chief, Strategist, Mentor, Confidant | Benefits, Criticize, Analytical, Fair Minded, Practical, Strong Willed, Competent, Determined, Head | |
| | White, Red, Orange, Yellow | Open, Outgoing, Talkative, Action, Outward, People Interaction, Expressive, Assertive, Flexible | Extravert |
| | Black, Blue, Violet, Gray | Private, Quiet, Reserved, Reflective, Inward, Concentration | Introvert |
| | Bluish Green, Brown, Pink, Yellow, White | Sensitive, Compassion, Feeling, Passionate, Sentimental, Caring, Kind, Tender, Devoted, Subjective, Praise, Understand, Merciful, Heart | Feeling |
| | Orange, Blue, Yellow, Violet | Firm, Foresight, Objective, Logical, Thinking, Convincing, Benefits, Criticize, Analytical, Fair Minded, Practical, Strong Willed, Competent, Determined, Head | Thinking |
| Privacy Settings (Protect my Tweets) Default Setting: Disabled | Disabled | Open, Public, Outward, People Interaction, Expressive, Flexible | Extravert |
| | Enabled* | Private, Quiet, Reserved, Reflective, Inward, Concentration | Introvert(MAX) |
| Privacy Settings (Find by Email) Default Setting: Enabled | Enabled | Open, Public, Outward, People Interaction, Expressive, Flexible | Extravert |
| | Disabled* | Private, Quiet, Reserved, Reflective, Inward, Concentration | Introvert(MAX) |
| Privacy Settings (Tweet location) Default: Off | On* | Open, Public, Outward, People Interaction, Expressive, Flexible | Extravert(MAX) |
| | Off | Private, Quiet, Reserved, Reflective, Inward, Concentration | Introvert |

*indicates that maximum weightage is given when overriding defaults.

Each profile attribute, such as Profession signifies a personality trait of the individual based on nature of the Profession. For example, an individual who has a profession listed as a mentor on his/her profile has a high possibility of possessing characteristics, such as being objective, logical, practical, and determined. Such characteristics of the individual with mentor as profession corresponds to psychological type of "Thinking" individual (as per the 4 psychological types defined using Myers Briggs Type Indicator). Therefore, the individual may be assigned score based on the identified or listed profession on his/her profile. Similarly, other attributes and characteristics listed in Table 7 signify other personality traits of individuals.

In an embodiment, the Table 7 may be implemented in form of one or more first rules in the memory 204. In an embodiment, the processor 202 may use the one or more first rules to determine the first score. Following table illustrates an example of determination of the first score based on the profile of the user, in accordance with at least one embodiment.

TABLE 8

Profile information of the user A from Twitter™ account

| | | | Weightage | | |
|---|---|---|---|---|---|
| Attribute | Value | E | I | T | F |
| Profile Settings Background Color | Blue | | AVG | AVG | |
| Profile Color | Brown | | | | AVG |
| Profession | Artist | | AVG | | AVG |
| Privacy settings (Protect tweets) | Disabled | AVG | | | |
| Privacy settings (Find me by email) | Disabled | | MAX | | |
| Privacy settings (Tweet location) | Off | | AVG | | |
| Profile Bio (extracted keywords) | Few, Private, Sensitive, Quiet, Just | | 3*AVG | 1*AVG | 1*AVG |
| Output - Profile Score (PS) | | 3 | 23 | 6 | 9 |

Table 8 includes profile information of a user A collected from his/her Twitter™ account. The profile settings of the user A include a plurality of profile attributes. Each profile attribute is associated with a value (that is indicative of the physiological type) and corresponding weightage. The assigned weightage corresponds to 4 psychological types identified as per Myers Briggs Type Indicator. The plurality of profile attributes include background color, profile color, profession, privacy settings for protecting tweets, privacy settings for "finding me by email," privacy settings for tweet location, and profile bio data based on extracted keywords. Based on one or more values of each profile attribute, a weightage is assigned. The weightage is assigned as per predefined parameters (explained in definition section for Attributes). Finally, the first score (or profile score) is computed for each profile attribute based on the assigned weightages.

As shown in Table 8, the user A has background color as blue on his Twitter™ profile. This color signifies characteristics that match with a personality of Introvert (I) and Thinking (T) person. A weightage, denoted by AVG, corresponding to a score of 3, is assigned to the color blue. The next attribute is the profile color of user A. As the profile color is brown, this may relate to characteristics of a Feeling (F) person. This attribute fetches an AVG score of 3. Further, user A is scored based on a profession of artist and enabled/disabled privacy settings as analyzed on his/her profile.

Furthermore, keywords are extracted from profile description on profile of user A. The extracted keywords include "few", "private", "sensitive", "quiet", and "just". In an embodiment, there may be multiple instances of reciting such keywords on the profile of the user A. The user A may be scored that many times for the psychological type matching with the psychological type as indicated by Myers Briggs Type Indicator. In the present example, as per Table 2, "few," "private" and "quiet" correspond to characteristics of an Introvert person, "sensitive" corresponds to characteristic of Feeling person and "just" corresponds to characteristic of Thinking person. Therefore, a final score (or the first score) is calculated based on values corresponding to assigned weightages to each profile attribute. When the corresponding values are added for all profile attributes, a score corresponding to each of the four psychological types is obtained. The final scores, labelled as "Output", are tabulated and shown in Table 8.

Referring back to FIG. 3, at step 304, a second score associated with the user is determined based on one or more activities of the user on the social media platform. In an embodiment, the processor 202 may identify the one or more activities of the user on the social media platform. The one or more activities on a social media platform, such as Twitter™, may include but are not limited to count of followers, count of people being followed, number of tweets, number of re-tweets, average tweets per day, tweets on business hours and tweets on weekends, first and last tweet time of a day, and the like. Thereafter, the processor 202 may utilize the statistics of the one or more activities to determine the second score. In an embodiment, the statistics associated with the one or more activities may include, but are not limited to, a number of followers/followings of a user on a social media platform. The details of computing the second score will be explained in description below with respect to Tables 9 and 10.

Similar to the profile score or the first score computed in Table 8 as per profile attributes defined in Table 7, a dataset is created to compute the second score or statistical data score of the user A based on statistical analysis on social activities of the user A. Assuming Twitter™ as the social media platform, it has been found recently that top 5% of the users on Twitter™ have an average of 50 followers and following count.

Table 9 includes a plurality of attributes related to statistical data of a user on the social media platform. Such attributes may include but are not limited to, Followers/Followings and Percentage difference between number of followers and followings. It will be apparent to a personal with ordinary skill in the art that different profile statistics on different social media platforms may be used without departing from the scope of the disclosed embodiments.

TABLE 9

Profile attributes for computing Statistical Data Score

| | Attributes | | Characteristics | Psychological type (weightage) |
|---|---|---|---|---|
| Profile Statistics | Followers/Followings | 0-25 | Private, Quiet, Reserved, Reflective, Inward, Concentration | Introvert (MAX) |
| | | 25-50 | Private, Quiet, Reserved, Reflective, Inward, Concentration | Introvert (AVG) |
| | | | Open, Public, Outward, People Interaction, Expressive, Flexible | Extravert (AVG) |
| | | 50-100 | Private, Quiet, Reserved, Reflective, Inward, Concentration | Introvert (LOW) |
| | | | Open, Public, Outward, People Interaction, Expressive, Flexible | Extravert (AA) |
| | | 100-1000 | Open, Public, Outward, People Interaction, Expressive, Flexible | Extravert (AA) |
| | | >1000 | Open, Public, Outward, People Interaction, Expressive, Flexible | Extravert (MAX) |
| | Percentage difference between number of followers & followings (Followers_count − Followings_count)/ Max(Followers_count, Followings_count) * 100 | 75-100 | Open, Public, Outward, People Interaction, Expressive, Flexible | Extravert (2 * MAX) |
| | | | Foresight, Objective, Logical, Thinking, Criticize, Analytical, Fair Minded, Practical, Strong Willed, Competent, Determined, Head | Thinking (2 * MAX) |
| | | 50-75 | Open, Public, Outward, People Interaction, Expressive, Flexible | Extravert (MAX) |
| | | | Foresight, Objective, Logical, Thinking, Criticize, Analytical, Fair Minded, Practical, Strong Willed, Competent, Determined, Head | Thinking (MAX) |

TABLE 9-continued

Profile attributes for computing Statistical Data Score

| Attributes | Characteristics | Psychological type (weightage) |
|---|---|---|
| 35-50 | Open, Public, Outward, People Interaction, Expressive, Flexible | Extravert (AA) |
| | Foresight, Objective, Logical, Thinking, Criticize, Analytical, Fair Minded, Practical, Strong Willed, Competent, Determined, Head | Thinking (AA) |
| 15-35 | Open, Public, Outward, People Interaction, Expressive, Flexible | Extravert (AVG) |
| | Foresight, Objective, Logical, Thinking, Criticize, Analytical, Fair Minded, Practical, Strong Willed, Competent, Determined, Head | Thinking (AVG) |
| 5-15 | Open, Public, Outward, People Interaction, Expressive, Flexible | Extravert (BA) |
| | Foresight, Objective, Logical, Thinking, Criticize, Analytical, Fair Minded, Practical, Strong Willed, Competent, Determined, Head | Thinking (BA) |
| −5 to 5 | Sensitive, Feeling, Sentimental, Kind, Tender, Subjective, Understand, Merciful, Heart | Feeling (AVG) |
| −5 to −15 | Private, Quiet, Reserved, Reflective, Inward, Concentration | Introvert (BA) |
| −15 to −35 | Private, Quiet, Reserved, Reflective, Inward, Concentration | Introvert (AVG) |
| −35 to −50 | Private, Quiet, Reserved, Reflective, Inward, Concentration | Introvert (AA) |
| −50 to −75 | Private, Quiet, Reserved, Reflective, Inward, Concentration | Introvert (MAX) |
| −75 to −100 | Private, Quiet, Reserved, Reflective, Inward, Concentration | Introvert (2 * MAX) |

As shown in Table 9, a psychological type of being introvert is perceived if a user has less number of followers and followings while more the number of followers/followings, higher is the possibility of the person being an extravert. As a general perception, a person who is being followed by many and follows many has an extravert nature while the one who follows a selected group of people and likewise, is followed by less people is introvert in nature. However, there may be a possibility that a reserved and quiet person with characteristics of an Introvert person is followed by many. Such a person may be a famous personality. In such a case, as shown in Table 9 for count of followers/followings as 25-50 and 50-100, he is scored as AVG for being both introvert and extravert. Similarly, Table 9 illustrates the weightages allocated according to percentage difference between number of followers and followings. The percentage difference between number of followers and followings is calculated using the formula 1:

(Followers count−Followings count)/Max (Followers count, Followings count)*100

Further, regarding assigned weightages for percentage difference parameter, a degree may be assigned along with the notation, such as (2*MAX). Such a notation represents a particular psychological type matching with either of 4 psychological types with a degree of 2. Accordingly, a score of (2*5), i.e., 10 will be allocated to that psychological type. The degree of weightages, as described above, may be determined beforehand based on statistical analysis of behavior types.

It will be apparent to a person having ordinary skill in the art that profile attributes for calculating the second score from statistical data is not limited to the profile attributes described in Table 9 and may extend to include number of tweets (or messages) over a predefined duration, average tweets (or messages) per day, a count of tweets (or messages) during business hours, tweets (or messages) over the weekends, first and last tweet time of a day when a tweet (or message) was sent by the user.

Table 10 illustrates an example for determining the second score from a profile of the user, in accordance with at least one embodiment. Table 10 has been explained in conjunction with Tables 1-9 and FIGS. 1-4. Therefore, explanation similar to that explained in earlier embodiments has been omitted for simplicity purpose.

TABLE 10

Statistical data for computing Statistical Data Score of the user A

| | | | Weightage | | | |
|---|---|---|---|---|---|---|
| | Attribute | Value | E | I | T | F |
| Profile statistics | Followers | 25 | | MAX | | |
| | Followings | 26 | AVG | AVG | | |
| | Percentage difference between Followers and Followings | ((25 − 26)/26) * 100 = −3.8 | | | | AVG |
| Output - Statistical Data Score (SDS) | | | 3 | 8 | 0 | 3 |

Considering the profile statistics of the user A from his/her Twitter™ profile, the number of followers of the user A are 25. As per parameters for assigning weightages given in Table 9, 25 followers correspond to assigned weight of Introvert (MAX) i.e. introvert nature with a score of 5. The number of people following the user A has a value of 26, therefore a score of 3 (AVG) is allocated to the user A for being both Introvert and Extravert. The percentage difference between followers and followings will be computed by formula 1 described above:

((25−26)/26)*100=−3.8

Based on attributes listed in Table 9, −3.8 falls in the bracket of (−5 to 5). Therefore, an AVG score of 3 corresponding to psychological type of a Feeling person will be allocated to user A. The final weightages according to the statistical parameters used for determining the second score are shown as Output in Table 10.

A person having ordinary skill in the art would understand that the scope of the disclosure is not limited to determining the social media platform as Twitter™. In an embodiment, information may be extracted from other social media platforms such as Facebook™, etc.

In an embodiment, the processor 202 may simultaneously follow the user on multiple social media platforms and compute the second score based on the one or more activities identified for one of the social media platforms used most frequently by the user. In an embodiment, the one or more activities of the user may be monitored by the processor 202 continuously over a predetermined period of time.

Referring back to step 306 of FIG. 3, one or more conversations of the user are extracted from the social media platform. In an embodiment, the processor 202 may extract the one or more conversations from the social media platform that the user is associated with. In an embodiment, the processor 202 may extract one or more conversations of the user from one or more social media platforms, either separately or simultaneously. For example, the user identified for analysis may be associated with multiple social media platforms, such as Twitter™, Facebook™, and Instagram™. Further, the processor 202 may retrieve the data such as number of followers from Twitter™, Facebook™, and Instagram™. However, the number of followers of the user on Twitter™, Facebook™, and Instagram™ may vary. The processor 202 may calculate the second score based on data extracted from multiple social media platforms by weighing the data against set parameters. In an embodiment, the one or more conversations may include emotions expressed by the user towards a product/service and/or may relate to the user's mood swings/personal experience.

At step 308, a third score is determined based on a context associated with the extracted conversations. In an embodiment, the processor 202 may determine the third score. The processor 202 may determine a part of speech associated with each word of a plurality of words extracted from the one or more conversations of the user based on the context database. Thereafter, the processor 202 may categorize the each word in the one or more categories. Post categorizing the one or more words in the one or more categories, the processor 202 may query the lexical database to determine a human emotion associated with the respective conversations from which the one or more words have been extracted. In an embodiment, the processor 202 utilizes the determined human emotion and the context of the conversation to determine a context emotion score (CES). The determination of the CES score has been described later in conjunction with FIG. 5.

In addition to the CES, the processor 202 may determine a keyword frequency score (KFS). In an embodiment, in order to determine the KFS, the processor 202 may extract the one or more words from the one or more conversations of the user. Further, the processor 202 may determine one or more keywords from the one or more words extracted from the one or more conversations. In an embodiment, a word may qualify as a keyword based on presence of said word in a keyword dataset built corresponding to a plurality of psychological types (i.e., Table 2). In an embodiment, the one or more words may be matched with the keyword dataset, as shown in Table 2. The one or more words that are found in the keyword dataset qualify as keywords and their corresponding psychological type is identified from the keyword dataset. Further, the processor 202 may determine a score may be computed based on the identified one or more keywords. Such a score may be computed based on a number of occurrences or frequency of the keywords in the one or more conversations as matched against the keyword dataset. Following table illustrates determination of the KFS:

TABLE 11

One or more conversations of the user A for computing Keyword Frequency Score

| Tweet | Extracted keywords | Weightage | | | |
|---|---|---|---|---|---|
| | | E | I | T | F |
| I'm feeling very bored | Feeling, bored | 1 * AVG | | | 1 * AVG |
| Indians had a convincing win against Aussies in T20 | Convincing, win | | | 2 * AVG | |
| Hearty wishes to Sunil, Happy married life ☺ | Hearty, wish, happy | | | | 3 * AVG |
| He never was in the limelight and his exit was no different. Thanks#Dravid for all these great years of cricket. Cricket has lost its gentleman, and I, the reason I used to love cricket | Love | | | 1 * AVG | 1 * AVG |
| Output - Keyword Frequency Score (KFS) | | 3 | 9 | 15 | |

As shown in Table 11, assuming Twitter™ as the social media platform that user A is associated with, a series of tweets are collected. The series of tweets are a part of one or more social activities that user A is involved in. Over a predetermined time period, user A tweeted four times on Twitter™. Table 11 shows one or more keywords extracted from each tweet that the user A tweeted. For instance, two keywords, namely, "feeling" and "bored" may be extracted from the first tweet "I'm feeling very bored". As per Table 2, the extracted keywords, i.e., "feeling" and "bored" correspond to characteristics of a Feeling and Introvert person. Therefore, a score of AVG with a degree of 1 is allocated to Feeling and Introvert psychological type. In such a case, degree refers to number of times a characteristic of a particular psychological type is matched. The keywords "convincing" and "win" may be extracted from the second tweet of the user A. These two keywords belong to characteristics displayed by a Feeling person (as per Table 2) and accordingly, a score of (2*AVG) is assigned to the second tweet. The keywords "hearty", "wish" and "happy" may be extracted from the third tweet of the user A. All these words display happiness and emotions of the user A and therefore correspond to characteristics portrayed by a Feeling person. Therefore, a score of (3*AVG) is assigned to Feeling psychological type. The keyword "Love" may be extracted from the fourth tweet of the user A. As per Table 2, the keyword "Love" corresponds to characteristic of both Thinking and Feeling psychological type. Therefore, a score of (1*AVG) is allocated to both psychological types. The final score (i.e., KFS) computed from tweets of user A is tabulated as Output in Table 11. In an embodiment, the processor 202 determines the third score by adding the CES and the KFS. The details of computing the third score as the CES will be explained in description below with respect to Table 16 in conjunction with FIG. 4.

A person having ordinary skill in the art will appreciate that the third score may correspond to either the KFS or CES alone or in combination. Further, any other score computed based on the context of the one or more conversations may be considered for calculating the third score without departing from the scope of the disclosure.

Referring back to step 310 of FIG. 3, the processor 202 may determine a psychological type of the user based on the first score, the second score, and the third score. As the first score, the second score, and the third score are determined for a predetermined time period, the psychological type of the user is valid only for the predetermined time period. In an embodiment, the processor 202 may determine a "behavior score" based on the first score, the second score, and the third score, based on which the psychological type of the user is determined. In an embodiment, the behavior score may be computed based on assigning weightages to each of the first score, the second score, and the third score. Further, each of the first score, the second score, and the third score may be raised to a power of a predetermined integer value. In an embodiment, the powers and the weightages assigned to each of the first score, the second score, and the third score may be decided based on testing, verification, and accuracy of results as measured with real-time user data. The surveyor or a third-party conducting a survey/poll to identify psychological type of a target audience may decide powers and the weightages assigned to each of the first score, the second score, and the third score. Following table illustrates an example first score, second score, and the third score:

TABLE 12

Example first score, the second score, and the third score

| | E | I | T | F |
|---|---|---|---|---|
| Output - Profile Score (PS) | 3 | 23 | 6 | 9 |
| Output - Statistical Data Score (SDS) | 3 | 8 | 0 | 3 |

TABLE 12-continued

Example first score, the second score, and the third score

|  | E | I | T | F |
|---|---|---|---|---|
| Output - Keyword Frequency Score (KFS) | 0 | 3 | 9 | 15 |
| Output - Context Emotion Score (CES) | 1 | 4 | 4 | 8 |
| Behavior Score |  | 7 | 38 | 19 | 35 |

From the table, it may be observed, the behavior score is sum of the first score, the second score, and the third score (i.e., sum of the KFS and CES).

A person having ordinary skill in the art would understand that the scope of the disclosure is not limited to determining the behavior score by adding the first score, the second score and the third score. In an embodiment, the processor 202 may utilize the following equation to determine the "behavior score":

$$BS=a*(PS)^{m1}+b*(SDS)^{m2}+c*(KFS)^{m3}+d*(CES)^{m4}$$

where, a, b, c, d are weightages with values between 0 and 1;

m1, m2, m3, m4 are the powers with integer values greater than 0; and

BS: Behavior score.

Referring to Table 12, the user under consideration is an introvert and a feeler (as maximum score is assigned to introvert and feeler).

It will be apparent to a person having ordinary skill in the art that Myers Briggs type indicator may be used as an indicator to perform psychological analysis of the users to predict the psychological type based on the computed behavior score. However, the disclosed embodiments are not limited to usage of only Myers Briggs Type Indicator and may extend to other mechanisms for predicting psychological types.

Figure 4:
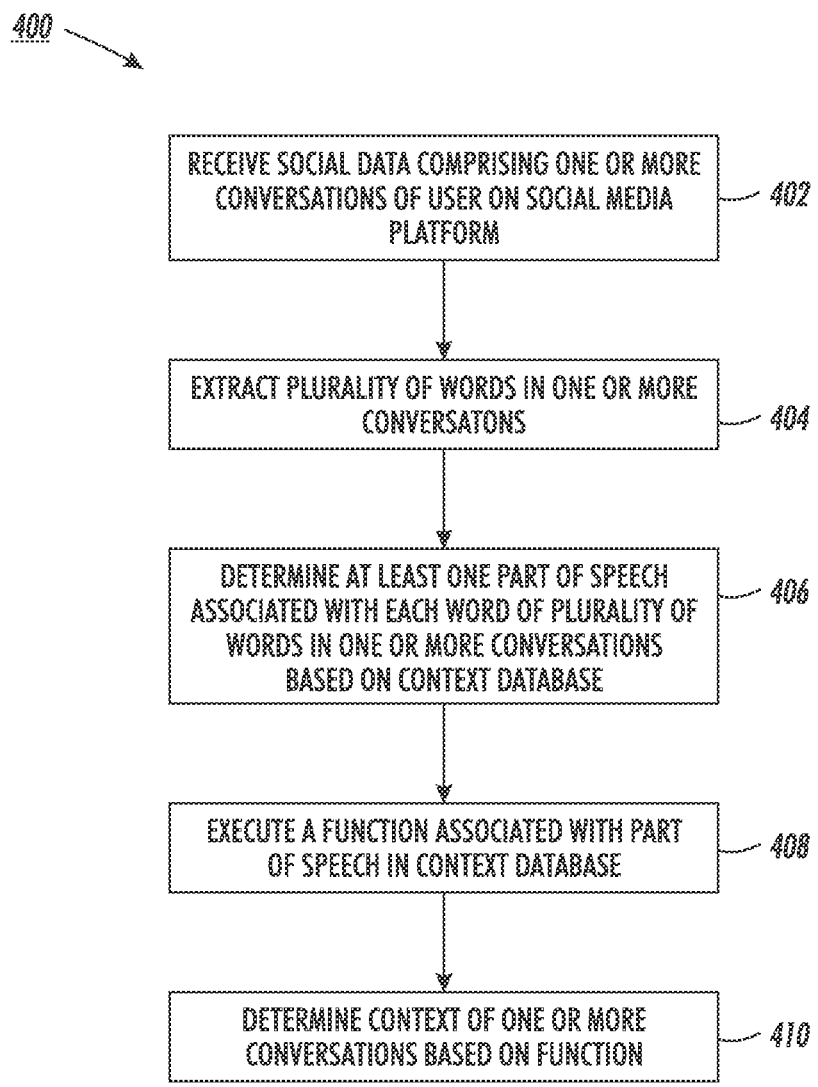
FIG. 4 is a flowchart illustrating a method to determine context of one or more conversations, in accordance with at least one embodiment.

FIG. 4 is a flowchart 400 illustrating a method to determine context of one or more conversations, in accordance with at least one embodiment. The flowchart 400 is described in conjunction with FIG. 1, FIG. 2, and FIG. 3.

At step 402, similar to step 306, social data that includes one or more conversations of the user from the social media platform is received.

At step 404, a plurality of words included in the one or more conversations are extracted. The processor 202 may extract the plurality of words from the one or more conversations.

At step 406, similar to step 308, at least one part of speech associated with each word of the plurality of words in the one or more conversations is determined based on the context database. In an embodiment, the processor 202 determines the part of speech associated with each word in the one or more conversations. Since, one word may relate to one or more parts of speech at the same time (such as, Conjunctions and Prepositions), a word occurring next to the word or succeeding the word is analyzed to determine the correct part of speech associated with that word. An example to handle such cases will be explained later in conjunction with FIG. 5.

At step 408, a function associated with the part of speech identified from the context database for each word of a plurality of words in the one or more conversations is executed. In an embodiment, the processor 202 may determine that a function associated with the part of speech is related to understand the human emotion being expressed or context of the one or more conversations. Further, the function of a part of speech identified may include neglecting the word itself because of no relevance of the word in understanding the context or human emotion being expressed in the one or more conversations. For example, if a part of speech associated with a word is an adverb, the processor 202 may determine the degree of the emotion being expressed in the conversation. Further, as discussed, each of the words in the conversations are categorized in the one or more predefined sets. In an embodiment, each of the one or more predefined sets correspond to the part of speech. For example, there may be two words in the conversation that may be categorized in the Adverb category.

At step 410, the context of the one or more conversations is determined based on executing the function associated with the part of speech identified for each word. In an embodiment, the processor 202 may utilize the lexical database to determine the context of the conversation. Further, the processor 202 may further check the presence of the word in the lexical database. If the word is present in the lexical database, the word is considered as a keyword, which may be used to determine the human emotion. In an embodiment, the processor 202 may follow a top-down approach. The process of determining the context of one or more conversations is explained below with respect to Tables 13 and 14A-14F.

TABLE 13

| Template for Context Emotion Table | | | | | | | | | | | | | | | | | | | | |
|---|---|---|---|---|---|---|---|---|---|---|---|---|---|---|---|---|---|---|---|---|
| Pronoun (Identification of person being referred) | Verb/Helping Verb (Identification of tense in which the emotion is being expressed) | | | Verb/Adjective/Adverb/Interjections/ Phrases/Negators (Identification of tertiary human emotion) | | | | | | | | | | | | | | | | |
| | | | | Amazement | | | Hatred | | | Hope | | | Adoration | | | Hurt | | | Fear | | |
| | Present | Past | Future | 1 | 2 | 3 | 1 | 2 | 3 | 1 | 2 | 3 | 1 | 2 | 3 | 1 | 2 | 3 | 1 | 2 | 3 |
| First Person | | | | | | | | | | | | | | | | | | | | | | |
| Second Person | | | | | | | | | | | | | | | | | | | | | | |
| Third Person | | | | | | | | | | | | | | | | | | | | | | |

In order to understand a context of social data extracted from profile of the user A, a look up table, such as Table 13 is built. The context of one or more conversations, such as tweets, when the social media platform is Twitter™ has been considered. The parameters as shown in Table 13 include Parts of Speech and their corresponding functions. There are majorly 3 columns in the Table 13. The first column is for identifying Pronouns. Pronouns, if found in tweets of the user A, are used to identify a person being referred to. The person may be a first person, i.e., self, a second person, or a third person in the one or more conversations, i.e., tweets. The second column corresponds to Verbs/Helping Verbs. Such Verbs/Helping Verbs are used for identification of tense in which a human emotion has been expressed. The tense may be present, past, or future. The third column corresponds to other parts of speech, such as Verb/Adjective/Adverb/Interjections/Phrases/Negators. These parts of speech are relevant in identifying a tertiary human emotion. The tertiary human emotion has been defined with respect to the lexical database, such as Parrott's Tree Structure Organization. As an example, five tertiary emotions have been listed corresponding to each primary emotion, as identified through Parrott's Tree Structure Organization. However, the five tertiary emotions have been listed for simplifying the understanding and may be extended to any number other than 5. However, it will apparent to a person having ordinary skill in the art that the tertiary emotions listed in the context emotion Table 13 may include other tertiary emotions listed in Table 3 and may vary from one conversation or tweet to another. Further, Table 13 may represent primary or secondary emotions in any number. For every tertiary emotion listed in Table 13, a degree of emotion is expressed as 1, 2, or 3 just beneath it. The degree of emotion may help in correctly measuring a depth or intensity of emotion that has been expressed in tweets.

Tables 14A-14F illustrate an example for understanding the context from social data extracted from a profile of user A on a social media platform, in accordance with at least one embodiment. Tables 14A-14F will be explained in conjunction with social data provided in Table 11 and template of look up table provided in Table 13. Tables 14A-14F explain analysis of the fourth tweet in Table 11 based on the context database illustrated in Table 6, as an example, to understand the context of tweet. The tweet, such as, "He never was in the limelight and his exit also was no different. Thanks #Dravid for all these great years of cricket. Cricket has lost its gentleman, and I, the reason I used to love cricket".

A surveyor or a third-party may utilize the application server 106 to execute an application on a surveyor computing device 110. The application may fetch data, such as social data of Twitter™ user A, as shown in Table 11. The processor 202 of the application server 106 may analyze and process the social data to understand context of the tweets posted by the user A on the social networking website Twitter™ for a predefined time duration.

In an embodiment, each word of a conversation or sentence of the tweet is entered in order into a queue data structure, such as first-in first-out (FIFO), till a sentence terminator such as a question mark, a full mark, or an exclamation remark is encountered. In an embodiment, a sentence ending with question mark is flagged as a question while a sentence ending with a full stop or exclamation mark is flagged as a statement. In an embodiment, words of a conversation or a tweet is entered in the queue till the queue is empty.

The processor 202 extracts the plurality of words included in the tweet posted by the user A. Each word extracted from the tweet is sequentially searched in the context database. A step-by-step interpretation of each word in the tweet is explained below.

The processor 202 searches for the first word, such as, "He", extracted from the plurality of words of the tweet, in the context database. The first word "He" is found in the context database and a part of speech corresponding to the first word "He" is mapped. Hence, the first word "He" is mapped to Pronoun in the context database. The processor 202 executes a function corresponding to the Pronouns, as stated in the column 3 of the context database is. Since, Pronouns are utilized to understand the person being referred, i.e. first person, second person, or third person, the "third person" is identified for the first word "he". Thereafter, in the Table 11, the third person is flagged under the Pronoun (first column).

The processor 202 searches for the second word "never" of the tweet in the context database. The second word "never" is found in the context database and the part of speech Negators is mapped corresponding to the identified second word. The processor 202 executes a function corresponding to Negators in the context database. Therefore, the processor 202 stacks the second word to negate the human emotion expressed by the following verb or adverb or adjective or phrase.

The processor 202 searches for the third word "was" of the tweet in the context database. The third word "was" is found in the context database and the part of speech Verb is mapped corresponding to the identified third word. Since the third word is identified as a Helping Verb, the processor 202 executes a function corresponding to Helping Verb in the context database. Therefore, the processor 202 understands the tense of the tweet as "past tense". Thereafter, Past tense is flagged in the Table 11 under Verb/Helping Verb (second column).

The processor 202 searches for the fourth word "in" of the tweet in the context database. The fourth word "in" is found in the context database and the part of speech Preposition is mapped corresponding to the identified fourth word. The processor 202 executes a function corresponding to Preposition in the context database. Therefore, the processor 202 waits for the occurrence of verb, as per the function.

The processor 202 searches for the fifth word "the" of the tweet in the context database. The fifth word "the" is not found in the context database. Since "the" is a determiner, an adjective always occurring before noun, it is not relevant for interpreting human emotions. Therefore, the fifth word is excluded from the context database and is neglected for understanding the context of the tweet.

The processor 202 searches for the sixth word "limelight" of the tweet in the context database. The sixth word "limelight" is not found in the context database. Since Nouns are not included in the context database, therefore, the sixth word is neglected for understanding the context of the tweet.

The processor 202 searches for the seventh word "and" of the tweet in the context database. The seventh word "and" is found in the context database and the part of speech Conjunction is mapped corresponding to the identified seventh word. The processor 202 executes a function corresponding to Conjunction in the context database. Therefore, the processor 202 marks the end of sentence but flags "continuity," i.e., the output of the following sentence is weighed with the current output, in the Table 11.

Now, till the end of seventh word, as per function of the seventh word "and," the processor 202 did not find any Verb after the fourth word "in". Therefore, the processor 202 confirms the fourth word "in" as Preposition and not a Conjunction. The processor 202 searches for phrases in the context database beginning with the fourth word "in". The words found in the context database are compared with the part following the fourth word "in". Therefore, the processor 202 matches the Phrase "in the limelight" to Phrases in the context database. A tertiary emotion is identified for the phrase found, using the lexical database (or Parrott's tree structured organization). Based on the human emotion expressed in the phrase, the processor 202, using inbuilt intelligence, identifies "Exhilaration" as the tertiary emotion. Following the bottom up approach, corresponding secondary emotion of "Zest" and primary emotion of "Joy" is identified from the lexical database. However, due to the presence of the second word "never" being identified a Negator, the primary emotion of "Joy" is negated. The emotion opposite in nature to the primary emotion is identified using Tables 3 and 4 (Parrott's tree structured emotions and Plutchik's wheel of emotions). Therefore, "Sadness" is identified as an emotion negating the "Joy" emotion.

The Context Emotion Table 11, at this stage, is updated to reflect the understanding of the context of the tweet as following:

Next, the processor 202 searches for the ninth word "exit" of the tweet in the context database. The ninth word "exit" is not found in the context database since adjectives not related to human emotions are excluded from the context database. Therefore, the ninth word "exit" is neglected for understanding the context of the tweet.

Then the processor 202 searches for the tenth word "was" of the tweet in the context database. Similar to the third word of the tweet, the processor 202 maps the tenth word "was" to the Helping verb category in the context database and flags "Past Tense" in the updated Context Emotion Table, as per the function of the Helping verb defined in the context database.

Again, the processor 202 searches for the eleventh word "no" of the tweet in the context database. Similar to the second word of the tweet, the eleventh word "no" is found in the context database and the part of speech Negators are mapped corresponding to the identified eleventh word. The processor 202 executes a function corresponding to Negators in the context database. Therefore, the processor 202 stacks the eleventh word to negate the human emotion expressed by the following verb or adverb or adjective or phrase.

Then the processor 202 searches for the twelfth word "different" of the tweet in the context database. The twelfth word "different" is not found in the context database since adjectives not related to human emotions are excluded from the context database. Therefore, the twelfth word "different" is neglected from understanding the context of the tweet.

The processor 202 encounters a full stop after twelfth word and treats it as an end of first sentence. Till this stage, i.e., end of first sentence, since there is no map to any human emotion after the updated Context Emotion Table, therefore, the Context Emotion Table remains unchanged.

TABLE 14A

Context Emotion Table for the user A at end of seventh word of tweet

| Pronoun (Identification of person being referred) | Verb/Helping Verb (Identification of tense in which the emotion is being expressed) | | | Verb/Adjective/Adverb/Interjections/ Phrases/Negators (Identification of tertiary human emotion) | | | | | | | | | | | | | | | | |
|---|---|---|---|---|---|---|---|---|---|---|---|---|---|---|---|---|---|---|---|---|
| | | | | Adoration | | | Exhilaration | | | Amazement | | | Frustration | | | Despair | | | Terror | | |
| | Present | Past | Future | 1 | 2 | 3 | 1 | 2 | 3 | 1 | 2 | 3 | 1 | 2 | 3 | 1 | 2 | 3 | 1 | 2 | 3 |
| First Person | | | | | | | | | | | | | | | | | | | | | |
| Second Person | | | | | | | | | | | | | | | | | | | | | |
| Third Person | Y | Y | | | | | N | | | | | | | | | | | | | | |

(Y stands for Yes and N stands for Negate)

Further, the processor 202 searches for the eighth word "his" of the tweet in the context database. The eighth word "his" is found in the context database and the part of speech Pronoun is mapped corresponding to the identified eighth word. The processor 202 executes a function corresponding to Pronoun in the context database. Therefore, the processor 202 maps the eighth word "his" to third person subset in the context database and flags it in the updated Context Emotion Table.

Further, the processor 202 searches for the thirteenth word "Thanks" of the tweet in the context database. The thirteenth word "Thanks" is found in the context database and Interjection is identified as the part of speech. Furthermore, the processor 202 may identify more than one part of speech for words in the tweet. In this case, the processor 202 maps the thirteenth word "Thanks" to third person subset in Pronoun and Present in tense. The processor 202 performs categorization of each word based on one or more words succeeding the word being categorized. Since the primary categorization of the thirteenth word "Thanks" corresponds to Interjection, the processor 202 executes a function corresponding to Interjection. The processor 202 understands the human emotion expressed by the thirteenth word "Thanks". Therefore, using Table 3 or lexical database, Adoration is identified as a tertiary emotion. Following the bottom up approach, Affection is identified as a secondary emotion and Love is identified as a primary emotion.

Next, the processor 202 searches for the fourteenth word "Dravid" of the tweet in the context database. The fourteenth word "Dravid" is not found in the context database. Since Nouns are not included in the context database, therefore, the fourteenth word "Dravid" is neglected for understanding the context of the tweet.

Then, the processor 202 searches for the fifteenth word "for" of the tweet in the context database. The fifteenth word "for" is found in the context database and the part of speech Preposition is mapped corresponding to the identified fifteenth word. As per the function of the Preposition in the context database, the processor 202 waits for the occurrence of Verb.

Next, the processor 202 searches for the sixteenth word "all" of the tweet in the context database. The sixteenth word Then, the processor 202 searches for the twentieth word "of" of the tweet in the context database. The twentieth word "of" is found in the context database and the part of speech Preposition is mapped corresponding to the identified fifteenth word. As per the function of the Preposition in the context database, the processor 202 waits for the occurrence of Verb.

Next, the processor 202 searches for the twenty first word "cricket" of the tweet in the context database. The twenty first word "cricket" is not found in the context database since Nouns are excluded from the context database. Therefore, the twenty first word "cricket" is neglected for understanding the context of the tweet.

The processor 202 encounters a full stop after twenty first word and treats it as an end of second sentence. Till this stage, i.e., end of second sentence in the tweet, no Verbs are found after the fifteenth word "for" and twentieth word "of", the processor 202 searches in Phrases and compares the segments after them. If the segments do not match the Phrases in context database, the process of understanding the context of the tweet halts. The Context Emotion Table after including the result of understanding the context of the tweet is as follows:

TABLE 14B

Context Emotion Table for the user A at end of second sentence of tweet

| Pronoun (Identification of person being referred) | Verb/Helping Verb (Identification of tense in which the emotion is being expressed) | | | Verb/Adjective/Adverb/Interjections/ Phrases/Negators (Identification of tertiary human emotion) | | | | | | | | | | | | | | | | |
|---|---|---|---|---|---|---|---|---|---|---|---|---|---|---|---|---|---|---|---|---|
| | | | | Adoration | | | Exhilaration | | | Amazement | | | Frustration | | | Despair | | | Terror | | |
| | Present | Past | Future | 1 | 2 | 3 | 1 | 2 | 3 | 1 | 2 | 3 | 1 | 2 | 3 | 1 | 2 | 3 | 1 | 2 | 3 |
| First Person | | | | | | | | | | | | | | | | | | | | | |
| Second Person | | | | | | | | | | | | | | | | | | | | | |
| Third Person | Y | Y | | | | | | | | | | | Y | | | | | | | | |

"all" is not found in the context database since adjectives not related to human emotions are excluded from the context database. Therefore, the sixteenth word "all" is neglected for understanding the context of the tweet.

The processor 202, then, searches for the seventeenth word "these" of the tweet in the context database. The seventeenth word "these" is found in the context database and the part of speech Pronoun is mapped corresponding to the identified seventeenth word.

Next, the processor 202 searches for the eighteenth word "great" of the tweet in the context database. The eighteenth word "great" is found in the context database and the part of speech Adjectives is mapped corresponding to the identified eighteenth word. However, as per the function corresponding to the Adjectives in the context database, the word identified as an Adjective is considered relevant for understanding the state of human emotion if it succeeds a Verb else the word is neglected for understanding the context of the tweet. Therefore, since no Verb precedes the eighteenth word "great", the eighteenth word "great" is neglected.

Further, the processor 202 searches for the nineteenth word "years" of the tweet in the context database. The nineteenth word "years" is not found in the context database since Nouns are excluded from the context database. Therefore, the nineteenth word "years" is neglected for understanding the context of the tweet.

Following the interpretation of second sentence in the tweet, the processor 202 searches for the twenty second word "Cricket" in the context database. Similar to the twenty first word "cricket" of the tweet, the twenty second word "Cricket" is also neglected for understanding the context of the tweet.

Next, the processor 202 searches for the twenty third word "has" of the tweet in the context database. The twenty third word "has" is found in the context database and the part of speech Verb is mapped corresponding to the identified twenty third word. Since the twenty third word is identified as a Helping Verb, the processor 202 executes a function corresponding to Helping Verb in the context database. Therefore, the processor 202 understands the tense of the sentence of the tweet as "past tense". Thereafter, Past tense is flagged in the Context Emotion Table under Verb/Helping Verb (second column).

Next, the processor 202 searches for the twenty fourth word "lost" of the tweet in the context database. The twenty fourth word "lost" is found in the context database and the part of speech Verb is mapped corresponding to the identified twenty fourth word. The tense is identified as past tense. The processor 202 executes a function of identified part of speech in the context database. Therefore, Despair is identified as a tertiary emotion using the lexical database in Table 3. Following the bottom up approach, Sadness is identified as a secondary emotion and Sadness is identified as the primary emotion too.

Further, the processor 202 searches for the twenty fifth word "its" of the tweet in the context database. The twenty fifth word "its" is found in the context database and the part of speech Pronoun is mapped corresponding to the identified twenty fifth word. The function corresponding to Pronoun in the context database is executed by the processor 202. Therefore, the processor 202 maps the twenty fifth word "its" to third person subset in the context database and flags it in the updated Context Emotion Table.

Next, the processor 202 searches for the twenty sixth word "gentleman" of the tweet in the context database. The twenty sixth word "gentleman" is not found in the context database since Nouns are excluded from the context database. Therefore, the twenty sixth word "gentleman" is neglected for understanding the context of the tweet.

The processor 202 searches for the twenty seventh word "and" of the tweet in the context database, similar to the seventh word. Therefore, the part of speech Conjunction is mapped corresponding to the identified twenty seventh word. The processor 202 executes a function corresponding to Conjunction in the context database. Therefore, the processor 202 marks the end of sentence but flags "continuity," i.e., the output of the following sentence is weighed with the current output, in the Context Emotion Table.

Further, the processor 202 searches for the twenty eighth word "I" of the tweet in the context database. The twenty eighth word "I" is found in the context database and the part of speech Pronoun is mapped corresponding to the identified twenty eighth word. The function corresponding to Pronoun in the context database is executed by the processor 202. Therefore, the processor 202 maps the twenty eighth word "I" to first person subset in the context database and flags it in the Context Emotion Table.

The processor 202 searches for the twenty ninth word "the" of the tweet in the context database, similar to the fifth word. Therefore, the twenty ninth word "the" is neglected for understanding the context of the tweet.

Next, the processor 202 searches for the thirtieth word "reason" of the tweet in the context database. The thirtieth word "reason" is not found in the context database. Since Nouns are not included in the context database, therefore, the thirtieth word "reason" is neglected for understanding the context of the tweet.

Similar to twenty eighth word "I", the processor 202 maps the thirty first word "I" to Pronoun and first person subset in the Context Emotion Table.

The processor 202 searches for the thirty second word "used" of the tweet in the context database. The thirty second word "used" is found in the context database, and is mapped to part of speech Verb and Negators. Following the functions of the parts of speech identified from the context database, past tense is identified and the processor 202 waits for the next word "to" to occur.

Further, the processor 202 searches for the thirty third word "to" of the tweet in the context database. Since the system including the processor 202 was waiting for "to" to occur, therefore, the thirty third word "to" is paired with thirty second word "used" and mapped as "used to" to Negators. Following the function of Negators in the context database, the processor 202 stacks the thirty third word "to" to negate the human emotion expressed by the following verb or adverb or adjective or phrase.

Next, the processor 202 searches for the thirty fourth word "love" of the tweet in the context database. The thirty fourth word "love" is mapped to Verb part of speech in the context database. The tense identified is present tense and overrides the past tense. Further, regarding the human emotion, Fondness is identified as a tertiary emotion from the lexical database. Following the bottom up approach, Affection is identified as secondary emotion and Love is identified as primary emotion from the lexical database. However, since part of speech is also identified as Negators, therefore, an emotion opposite in nature to that identified using Verb is negated. Using Table 3 (or one of the plurality of look-up tables), opposite of Love, i.e., Hatred or Anger is outputted.

Next, the processor 202 searches for the thirty fifth word "cricket" of the tweet in the context database, similar to previous recitations in the tweet. Being a Noun, the thirty fifth word "cricket" is neglected for understanding the context of the tweet.

The processor 202 encounters a full stop after the thirty fifth word in the tweet and treats it as end of third sentence. The updated Context Emotion Table for the third sentence has the following state:

TABLE 14C

| | | | | | | Context Emotion Table for the user A at end of third sentence of tweet | | | | | | | | | | | | | |
|---|---|---|---|---|---|---|---|---|---|---|---|---|---|---|---|---|---|---|---|
| Pronoun (Identification of person being referred) | Verb/Helping Verb (Identification of tense in which the emotion is being expressed) | | | Verb/Adjective/Adverb/Interjections/ Phrases/Negators (Identification of tertiary human emotion) | | | | | | | | | | | | | | | |
| | Present | Past | Future | Fondness | | | Exhilaration | | | Amazement | | | Frustration | | | Despair | | | Terror | | |
| | | | | 1 | 2 | 3 | 1 | 2 | 3 | 1 | 2 | 3 | 1 | 2 | 3 | 1 | 2 | 3 | 1 | 2 | 3 |
| First Person | Y | Y | | N | | | | | | | | | | | | | | | | | |
| Second Person | | | | | | | | | | | | | | | | | | | | | |
| Third Person | Y | Y | | | | | | | | | | | | | | | Y | | | | | |

TABLE 14D

Context Emotion Table for the user A depicting tertiary human emotions

| Pronoun (Identification of person being referred) | Verb/Helping Verb (Identification of tense in which the emotion is being expressed) | | | Verb/Adjective/Adverb/Interjections/ Phrases/Negators (Identification of tertiary human emotion) | | | | | | | | | | | | | | | |
|---|---|---|---|---|---|---|---|---|---|---|---|---|---|---|---|---|---|---|---|
| | | | | Adoration[1] Fondness[2] | | | Exhilaration | | | Amazement | | | Frustration | | | Despair | | | Terror | | |
| | Present | Past | Future | 1 | 2 | 3 | 1 | 2 | 3 | 1 | 2 | 3 | 1 | 2 | 3 | 1 | 2 | 3 | 1 | 2 | 3 |
| First Person | Y | Y | | N[2] | | | | | | | | | | | | | | | | | |
| Second Person | | | | | | | | | | | | | | | | | | | | | |
| Third Person | Y | Y | Y | Y[1] | | | N | | | | | | | | | Y | | | | | |

TABLE 14E

Context Emotion Table for the user A depicting secondary human emotions

| Pronoun (Identification of person being referred) | Verb/Helping Verb (Identification of tense in which the emotion is being expressed) | | | Verb/Adjective/Adverb/Interjections/ Phrases/Negators (Identification of secondary human emotion) | | | | | | | | | | | | | | | |
|---|---|---|---|---|---|---|---|---|---|---|---|---|---|---|---|---|---|---|---|
| | | | | Affection | | | Zest | | | Surprise | | | Exasperation | | | Sadness | | | Horror | | |
| | Present | Past | Future | 1 | 2 | 3 | 1 | 2 | 3 | 1 | 2 | 3 | 1 | 2 | 3 | 1 | 2 | 3 | 1 | 2 | 3 |
| First Person | Y | Y | | N | | | | | | | | | | | | | | | | | |
| Second Person | | | | | | | | | | | | | | | | | | | | | |
| Third Person | Y | Y | Y | Y | | | N | | | | | | | | | Y | | | | | |

TABLE 14F

Context Emotion Table for the user A depicting primary human emotions

| Pronoun (Identification of person being referred) | Verb/Helping Verb (Identification of tense in which the emotion is being expressed) | | | Verb/Adjective/Adverb/Interjections/ Phrases/Negators (Identification of primary human emotion) | | | | | | | | | | | | | | | |
|---|---|---|---|---|---|---|---|---|---|---|---|---|---|---|---|---|---|---|---|
| | | | | Love | | | Joy | | | Surprise | | | Anger | | | Sadness | | | Fear | | |
| | Present | Past | Future | 1 | 2 | 3 | 1 | 2 | 3 | 1 | 2 | 3 | 1 | 2 | 3 | 1 | 2 | 3 | 1 | 2 | 3 |
| First Person | Y | Y | | N | | | | | | | | | | | | | | | | | |
| Second Person | | | | | | | | | | | | | | | | | | | | | |
| Third Person | Y | Y | Y | Y | | | N | | | | | | | | | Y | | | | | |

As seen above in Table 14F, four primary emotions have been identified from the tweet of the user A. These are Negation of Love, i.e., Anger expressed for self, Love expressed for third person, Negation of Joy, i.e., Sadness expressed for third person and Sadness expressed for self. Further, each primary emotion has been identified with a degree of 1. Further, the opposite nature i.e. negation of each primary emotion may be identified from one of the plurality of look-up tables, i.e., Table 4.

Table 15 illustrates an example of mapping primary human emotions to psychological types.

TABLE 15

Mapping primary emotions to psychological types.

| Degree of emotion | Polarity | E | I | T | F | Weightage |
|---|---|---|---|---|---|---|
| 1 | Self | Love, Joy, Anger | Love, Joy, Sadness, Fear | Sadness, Surprise, Fear | | Min |
| | others | | Love, Joy, Surprise, Anger | Fear, Sadness | Fear | BA |
| 2 | Self | Sadness, Surprise | Surprise, Anger | Anger | Love, Joy | AVG |
| | others | | Sadness, Fear | Surprise, Anger | Love, Joy | AVG |
| 3 | Self | Fear | | Love, Joy | Anger, Surprise, Fear, Sadness | MAX |
| | others | Love, Joy, Surprise, Anger, Sadness, Fear | | | Anger, Sadness, Surprise | MAX |

In an embodiment, the primary human emotions detected from tweets may be mapped to psychological types identified using Myers Briggs Type indicator. The processor 202 may utilize Table 15 to compute the third score (or CES). Table 16 illustrates an example of computing a third score (CES) from a profile of user A on a social media platform, in accordance with at least one embodiment.

Table 13 has been explained in conjunction with social data extracted from profile of user A, as shown in Table 11 and Context Emotion Tables explained above in Tables 14A-14F and Table 15.

TABLE 16

Computing Context Emotion Score from one or more conversations of the user A

| | | Weightage | | | |
|---|---|---|---|---|---|
| Tweet | Derived Value (degree) | E | I | T | F |
| I'm feeling very bored. | Sadness expressed for self with degree 3 | | | | MAX |
| Indians had a convincing win against Aussies in T20 | Joy expressed for others with degree 1 | BA | | | |
| Hearty wishes to Sunil, Happy married life. ☺ | Joy expressed for others with degree 2 | | | | AVG |
| He never was in the limelight and his exit also was no different. | Sadness expressed for others with degree 1 | | | BA | |
| Thanks #Dravid for all these great years of cricket. | Sadness expressed for others with degree 1 | | | BA | |
| | Love expressed for others with degree 1 | | | BA | |
| Cricket has lost its gentleman, and I, the reason I used to love cricket. | Anger expressed for self with degree 1 | MIN | | | |
| Context Emotion Score (CES) | | 1 | 4 | 4 | 8 |

As explained in Tables 14A-14F, the output of Context Emotion Tables after analyzing each word in the tweet of user A are one or more primary human emotions. The one or more primary emotions, whether expressed for self or others may be identified from the tweet using Table 15. In an embodiment, the degree of emotions expressed in the tweet may be identified based on inbuilt intelligence of the system or predefined databases. The predefined databases may demarcate clearly a degree of each emotion based on learned words or usage of words over a predefined time. In an embodiment, the predefined databases may include a degree of emotion predetermined corresponding to each of a plurality of words. In an embodiment, the context database may include degree of each emotion corresponding to each of a plurality of words categorized based on part of speech identified for each word.

As shown in Table 16, the one or more activities of user A on Twitter™ include 4 tweets tweeted by the user A over a period of time. Each of these 4 tweets may be analyzed by plotting Context Emotion Tables, similar to Tables 14A-14F. The output of primary human emotions from each of the Context Emotion Tables may be mapped to psychological types using Table 15. Each of one or more primary emotions outputted may be identified as expressed with respect to self or others along with a level of degree. In an embodiment, the degree of each primary emotion may be identified using the context database and the plurality of look-up tables.

Referring to Table 16, the context of the first tweet by user A using Context Emotion Table identifies Sadness as the primary human emotion. Based on result of analysis, Sadness is expressed for self with a degree of 3. Using Table 15, Sadness expressed for self with a degree of 3 corresponds to a psychological type of a Feeling person with a weightage denoted by MAX. Accordingly, the first tweet is allocated a weightage of MAX under F. Similarly, the second tweet of the user A outputs the primary human emotion as Joy expressed for other with a degree of 1. Using Table 15, Joy expressed for others with a degree of 1 corresponds to a personality trait of an Introvert person with a weightage denoted by BA (below average). The third tweet of the user A also identifies Joy as the primary emotion expressed for others with a degree of 2. This corresponds to psychological type of a Feeling person with a weightage of 3, i.e., AVG assigned to it. Lastly, for the fourth tweet, 4 primary human emotions have been identified. The identification of the 4 primary human emotions has been explained above in Tables 14A-14F. Accordingly, depending on degree and polarity, i.e., expressed with respect to self or others, a weightage has been assigned as defined in Table 15. A total of all weightages is added and a final score corresponding to each psychological type is outputted as Context Emotion Score (CES). In an embodiment, the processor 202 computes the third score as CES.

Figure 5:
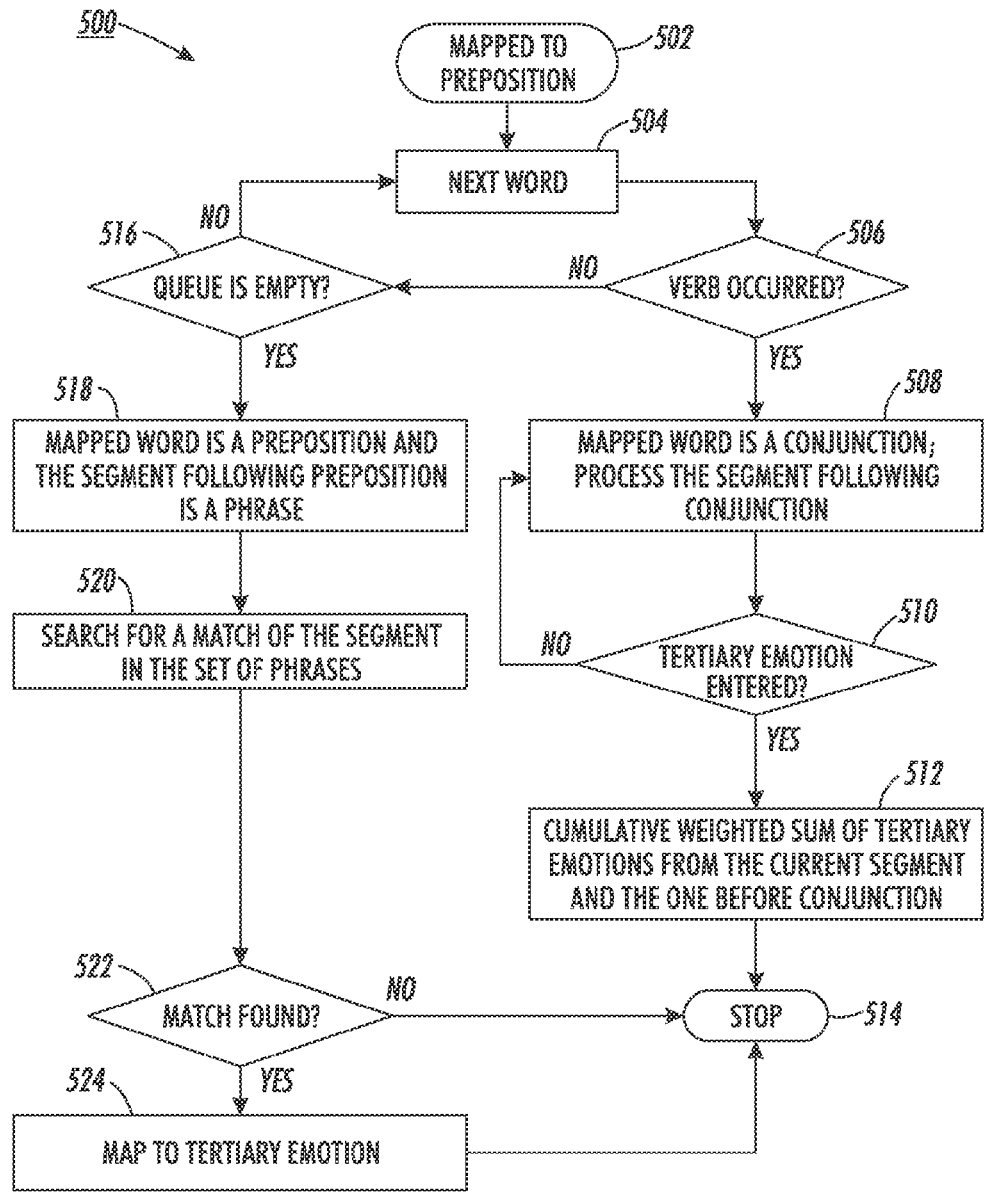
FIG. 5 is a flowchart for handling a special case while understanding the context of one or more conversations of user on a social media platform, in accordance with at least one embodiment.

FIG. 5 is a flowchart for handling a special case while understanding the context of one or more conversations of user on a social media platform, in accordance with at least one embodiment.

FIG. 5 will be explained in conjunction with Tables 1-16 and FIGS. 1-4. As shown above in Tables 14A-14F, while understanding the context of fourth tweet of user A on Twitter™, the part of speech for each word is detected using the context database. However, out of the 10 discrete sets defined for part of speech, mapping of all parts of speech and corresponding function is easily executed as per the function defined in the context database. However, mapping of three sets, namely Conjunction, Preposition and Negators, may involve decision making based on the succeeding word for its function to be executed. In an embodiment, there may be words in plurality of words in one or more conversations of a user, such as a tweet on Twitter™, which may belong to both Preposition and Conjunction. For words categorized under the Negators category, the function is executed when tertiary emotion is identified and entered in the Context Emotion Table. Therefore, the processor 202 handles both such cases separately while understanding the context of the one or more conversations.

FIG. 5 will be explained from the point when one of the words of a plurality of words in a tweet of a user is mapped to Preposition part of speech such that the function corresponding to Preposition is executed properly.

At step 502, the processor 202 maps one of a plurality of words in a tweet of a user to Preposition part of speech in the context database.

At step 504, the processor 202 waits for the next word in the plurality of words in the tweet of the user to be processed for understanding the context.

At step 506, the processor 202 analyzes if the next word belongs to Verb part of speech. If the next word is a Verb, the process proceeds to step 508 else to step 516.

At step 508, after confirming the occurrence of Verb as a next word, the processor 202 determines that the mapped word at step 502 is a Conjunction and thereafter, the processor 202 processes the segment (i.e., plurality of words) following the Conjunction. In an embodiment, the segment, such as "not on equal terms", is matched with the Phrases in the context database.

At step 510, after comparing the segment with the Phrases in the context database, when a match is found, the processor 202 identifies a tertiary human emotion associated with the match found, using the lexical database (or Parrott's tree structured organization). The identified tertiary human emotion is entered in the Context Emotion Table built up for understanding the context of the tweet.

At step 512, once the tertiary human emotion is identified, the processor 202 determines a cumulative weighted sum of tertiary human emotions from the current segment and the one before the Conjunction.

At step 514, the process stops after determining the cumulative sum of the segment being processed for understanding the context of the tweet.

Further, at step 516, when the word succeeding the word mapped to Preposition at step 502 is not a Verb, the processor 202 determines if the queue is empty. In an embodiment, each word of a plurality of words in the tweet is assumed to be inputted into a FIFO (First in First Out) queue so that each word may be processed based on its occurrence. When it is determined that queue is empty, the process proceeds to step 518 else loops back to step 504 and waits for the next word.

At step 518, after confirming that the queue is empty and no word follows the word mapped as Preposition, the processor 202 confirms the mapped word at step 502 as a Preposition. Further, the segment following the Preposition is confirmed as a phrase.

At step 520, the processor 202 searches for the segment, identified as a Phrase in step 518, in the set of Phrases predefined in the context database.

At step 522, the processor 202 determines if a match is found in the context corresponding to the identified phrase. If a match is found, the process proceeds to step 524 else halts at step 514.

At step 524, a tertiary human emotion is identified for the match found in the context database corresponding to the identified segment. After identifying the tertiary human emotion using the lexical database (i.e., Table 3).

Tables 17A-17B illustrates a specific example of detecting sarcasm in one or more conversations of user on a social media platform, in accordance with at least one embodiment.

Tables 17A-17B has been explained in conjunction with Tables 1-16 and FIGS. 1-4. Considering one of the conversation as one of the tweet posted by a user as an example for understanding the hidden sarcasm, the tweet on the social media platform Twitter™ reads: "I hate that I am perfect".

A Context Emotion Table is built for understanding the context of the tweet, similar to Tables 14A-14F. The explanation of processing each word and identifying a part of speech using the context database has been omitted. Accordingly, the Context Emotion Table for the tweet mentioned-above after processing each word and executing the function associated with each part of speech is shown below:

TABLE 17A

Detecting Sarcasm using Context Emotion Table

| Pronoun (Identification of person being referred) | Verb/Helping Verb (Identification of tense in which the emotion is being expressed) | | | Verb/Adjective/Adverb/Interjections/Phrases*/Negators* (Identification of tertiary human emotion)* | | | | | | | | | | | | | | | | |
|---|---|---|---|---|---|---|---|---|---|---|---|---|---|---|---|---|---|---|---|---|
| | | | | Amazement | | | Hatred | | | Hope | | | Adoration | | | Hurt | | | Fear | | |
| | Present | Past | Future | 1 | 2 | 3 | 1 | 2 | 3 | 1 | 2 | 3 | 1 | 2 | 3 | 1 | 2 | 3 | 1 | 2 | 3 |
| First Person | Y | Y | | | | | Y | | | | | | Y | | | | | | | | |
| Second Person | | | | | | | | | | | | | | | | | | | | | |
| Third Person | | | | | | | | | | | | | | | | | | | | | |

As per analysis, in the tweet, "hate" is identified as a negative emotion and "perfect" is identified as a positive emotion and the weight assigned to both words is unity. The polarity of human emotions may be detected using Table 5.

In an embodiment, a cumulative sum for the words related to human emotions using the Context Emotion Table may be calculated by categorizing the emotions into positive and negative polarity as per Table 5 using the formula:

$$\text{Cumulative sum} = -\Sigma(\text{negative emotion}*\text{weight}) + \Sigma(\text{positive emotion}*\text{weight}) + \Sigma(\text{neutral emotion}*\text{weight})$$

Therefore, for the above-mentioned tweet and Table 17A, the cumulative sum is:

$$\text{Cumulative sum} = -(1*1) + (1*1) + (0*0)$$

Therefore, cumulative sum is null. However, human behavioral logic says that if an individual is expressing both positive and negative emotions about self with equal weightage, he is projecting himself positively in a "sarcastic manner". Accordingly, applying the logic to the tweet, the human behavioral logic defines that no individual would hate himself for being perfect. Therefore, the hidden meaning from the tweet implies that an individual is expressing himself sarcastically. Hence, in the tweet, the effective tertiary map is negation of hatred in continuity with same polarity of perfection. The Context Emotion table is updated to reflect the changes as follows:

As shown in Table 17B, the decision of final mapping depends on the preceding helping word in case a test word is mapped to present case in Verb based on functions defined in the context database.

Accordingly, the processor 202 analyzes one or more conversations of users over a period of time and understands sarcasm intended by one or more users. Identifying hidden sarcasm in one or more conversations enables the disclosed system of the present disclosure to avoid misinterpreting human emotions. Therefore, the context of the one or more conversations may be understood with better accuracy and precision.

Figure 6A:
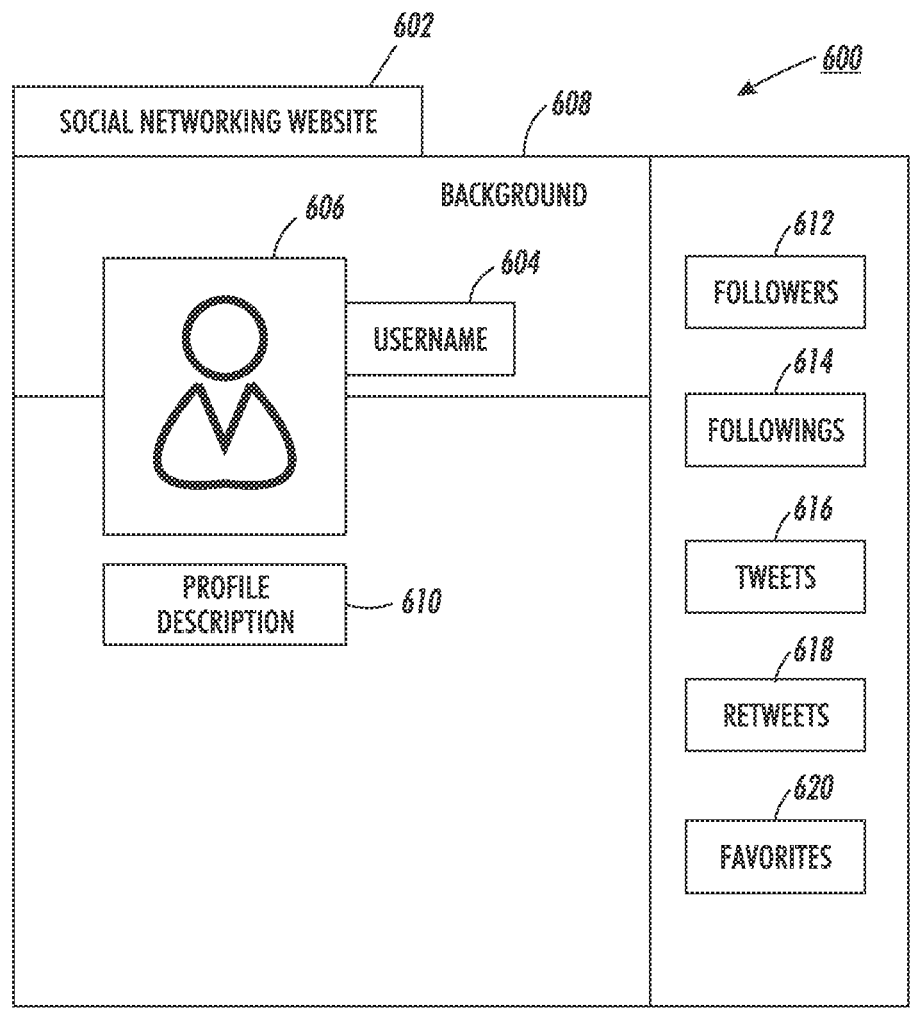
FIGS. 6A and 6B are block diagrams illustrating graphical user interfaces for predicting a psychological type of a user, in accordance with at least one embodiment.
Figure 6B:
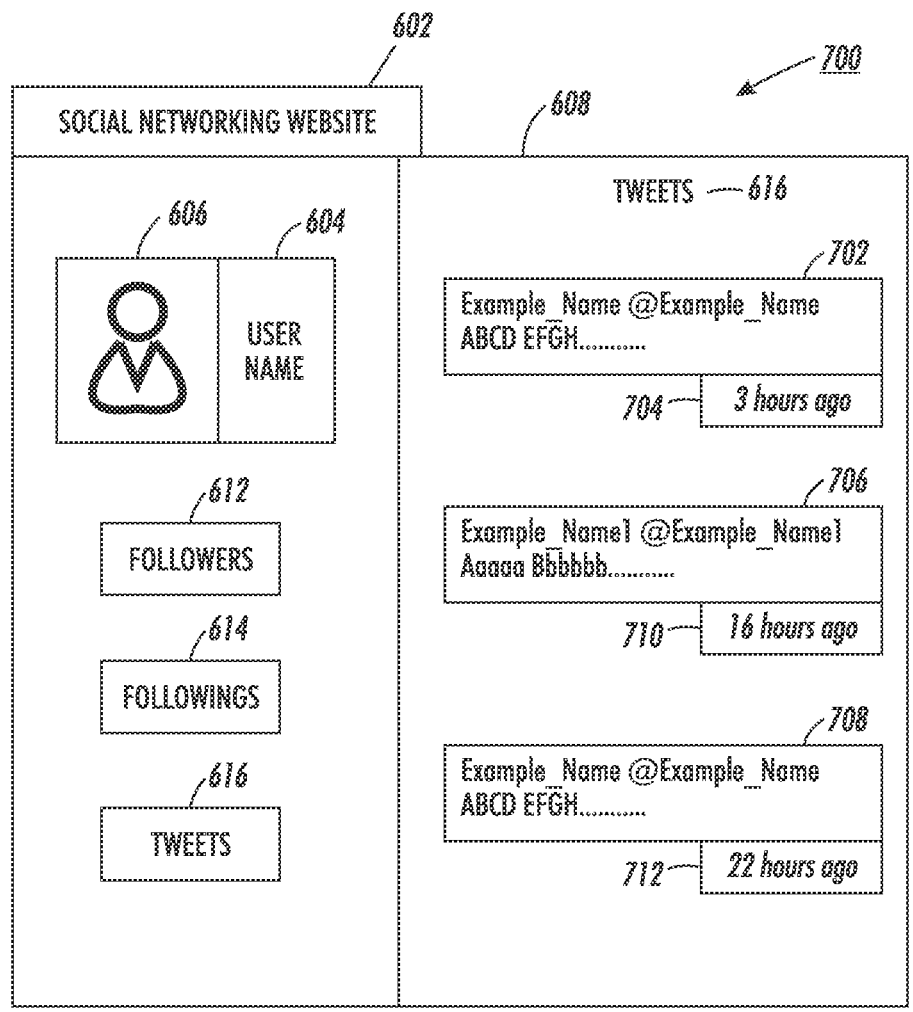

FIGS. 6A and 6B are block diagrams illustrating graphical user interfaces for predicting a psychological type of a user, in accordance with at least one embodiment.

FIGS. 6A and 6B have been explained in conjunction with FIGS. 1-5 and Tables 1-17. It will be apparent to a person having ordinary skill in the art that results obtained from each of the Tables 5-17 may be utilized in FIGS. 6A and 6B without unreasonable experimentation.

In an embodiment, a user may visit a social networking website, such as Twitter™, by the network 112. The user may use the user-computing device 102 to create a profile on Twitter™ by registering on the social networking website. The registration would ask the user to provide his/her credentials, such as username and password for logging-in to the social networking website. Once the profile of user is

TABLE 17B

Updated Context Emotion Table based on cumulative sum

| Pronoun (Identification of person being referred) | Verb/Helping Verb (Identification of tense in which the emotion is being expressed) | | | Verb/Adjective/Adverb/Interjections/Phrases*/Negators* (Identification of tertiary human emotion)* | | | | | | | | | | | | | | | | |
|---|---|---|---|---|---|---|---|---|---|---|---|---|---|---|---|---|---|---|---|---|
| | | | | Amazement | | | Hatred | | | Hope | | | Adoration | | | Hurt | | | Fear | | |
| | Present | Past | Future | 1 | 2 | 3 | 1 | 2 | 3 | 1 | 2 | 3 | 1 | 2 | 3 | 1 | 2 | 3 | 1 | 2 | 3 |
| First Person | Y | Y | | | | | | | | | | | Y | | | | | | | | |
| Second Person | | | | | | | | | | | | | | | | | | | | | |
| Third Person | | | | | | | | | | | | | | | | | | | | | | successfully created, the user may access one or more services provided by Twitter™ through the social media server 104.

In an embodiment, such numerous profiles of users may be available on Twitter™ based on settings applied exclusively by the owners of respective user profiles. The user may perform one or more activities on Twitter™, such as tweets related to sharing articles, sharing image files, video files, audio files, updating status and the like. In an embodiment, the tweets may correspond to their personal views on products/commodities purchased by them, their views on services provided by one or more telecom vendors, restaurants, hotels, resorts, clothing brands, home appliance brands, airlines, and the like. It will be apparent to a person having ordinary skill in the art that Twitter™ being a microblogging site, each user is free to express his/her views on anything that he feels like, without limiting the scope of the disclosed embodiments.

In an embodiment, the profiles of users on Twitter™ with/without username and password may be stored in the database server 108. The application server 106 may access the data stored in the database server 108 on the surveyor computing device 110. In an embodiment, a survey may be conducted by a third party or any party interested in analyzing the behavior of users on the social networking website Twitter™. The interested party may execute an application via the application server 106 on the surveyor computing device 110 to understand the context of tweets and accordingly design business solutions that may be dynamically strategized to accommodate changes in the mood of their target audience (or user profiles being analyzed). Further, based on predicting psychological types of users, business solutions may be focused on users belonging to same psychological type. In an embodiment, the third party may be recruitment agents that may want to filter candidates based on their mood swings. In an embodiment, a third party may conduct mood swing analysis of a specific user or group of users on a specific geography or location or filtered category after or before a product release. In an embodiment, users of same psychological may be grouped and a customer agent may be mapped to better understand the implicit user expectation and resolve queries efficiently. Further, the customer care agent may be trained to respond to customers based on their predicted psychological type. In an embodiment, a survey may be conducted to find attitude of users changes over time, for example, a user may become terser or less friendly. Accordingly, a surveyor or business strategist may push such users into a pool of people who should receive a special offer in an attempt to improve their feelings toward a particular company. In an embodiment, the surveyor may conduct a survey to provide a service to data shift in order to identify the customer behavior expectation.

In an embodiment, human emotions may be detected automatically by executing such an application without user intervention. In an embodiment, a history of social data, such as tweets of users, may be stored in the database server 108 such that human emotion detection may be automated. In an embodiment, the context-emotion analysis on users may be conducted by users itself to understand their psychological type.

FIGS. 6A and 6B show a graphical user interface (GUI) as seen on the surveyor computing device 110 when an application to understand the context of tweets is being executed by the application server 106.

FIG. 6A comprises a series of graphical icons on GUI 600 of a social networking website. The GUI includes icons, such as, social networking website 602, username 604, profile picture 606, background 608, profile description 610, followers 612, followings 614, tweets 616, retweets 618, and favorites 620.

The social networking website 602 icon includes a name of a social networking website, where profiles of users are being analyzed by the surveyor. The username 604 icon corresponds to a name of a user being registered on the social networking website. The profile picture 606 icon corresponds to an image representing a user being identified on the social networking website. The background 608 icon corresponds to a background image of the profile of the user and the background color of the profile of user. The profile description 610 corresponds to text written by the user on the social networking website to describe himself. The profile description 610 of the user may include profession, interests, hobbies, and the like. The information extracted from the user's profile, such as profile picture 606, background 608, and profile description 610 may be used to determine the first score associated with the user. The profile attributes and corresponding calculation of the first score of a user has been explained above in conjunction with Tables 7 and 8.

The followers 612 icon includes a count of number of people following the user with username 604. The followings 614 icon includes a count of number of people being followed by the user with username 604. The tweets 616 icon includes a number of tweets being tweeted by the user over a predefined time, such as a day, a week, a fortnight, a year, and the like. The retweets 618 icon includes a number of tweets being retweeted by the user with username 604. The number of tweets being retweeted may be tweets of other people on the social networking website that they may have posted on their profile. The favorites 620 icon includes a number of tweets marked as favorite by the user on his profile. The number of tweets marked as favorite may include tweets of people being followed by the user. The information extracted from statistical data, such as followers 612, followings 614, tweets 616, retweets 618, and favorites 620 may be used to determine the second score associated with the user. The profile attributes and corresponding calculation of the second score of a user has been explained above in conjunction with Tables 9 and 10.

FIG. 6B comprises a series of graphical icons on GUI 700 of a social networking website. The GUI 700 possesses a similar look and feel to GUI 600. The graphical icons similar to those explained in FIG. 6A have been excluded for simplicity purpose. The GUI 700 includes icons, such as, tweets 616 of the user. The tweets 616 of the user may include a first tweet 702 at time 704, a second tweet 706 at time 710, a third tweet 708 at time 712.

In order to determine the context of tweets 616 posted by the user on his profile over a predefine duration, GUI 700 may be displayed on a display of the surveyor computing device 110. The first tweet 702 by the user includes a textual phrase that may determine the mood/experience/information related to the user. A time stamp of when the first tweet 702 has been posted by the user on his profile may be determined based on time 704. Similarly, the second tweet 706 and the third tweet 708 may be determined to be posted at respective time 710 and 712. For example, if the surveyor wishes to gather the tweets of the user over a day, then a set of tweets from the tweets 616 may be populated, such as the first tweet 702 posted 3 hours ago, the second tweet 706 posted 16 hours ago and the third tweet 708 posted 22 hours ago. The surveyor may determine the context of the first tweet 702, the second tweet 706 and the third tweet 708 using Context Emotion Tables, as explained above with reference to Tables 14A-14F. Finally, the third score may be determined based on tweets 616 extracted by the surveyor, as explained above with reference to Tables 15 and 16.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, "C," "C++," "Visual C++," Java, and "Visual Basic." Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for determining a psychological type of a user have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for determining a psychological type of a user, the method comprising:
   assigning, by one or more processors, based on a personality type indicator, a plurality of weightages to a plurality of attributes associated with a profile of said user on a social media platform;
   determining, by said one or more processors, a first score associated with said user based on said assigned plurality of weightages;
   determining, by said one or more processors, a second score associated with said user based on one or more activities of said user on said social media platform;
   determining, by said one or more processors, a part of speech associated with each word of a plurality of words in one or more conversations of said user on said social media platform, wherein said determination of said part of speech is based on a context database;
   categorizing, by said one or more processors, said each word of said plurality of words in one or more categories based on said part of speech associated with said each word;

determining, by said one or more processors, context of said one or more conversations based on said categorization;

determining, by said one or more processors, a third score associated with said user based on said context of said one or more conversations;

determining, by said one or more processors, said psychological type of said user based on said first score, said second score, and said third score; and transmitting information, by said one or more processors, based on said determined psychological type, wherein said information indicates at least one of promotional offers, advertisements, marketing strategies, or publicity strategies.

2. The method of claim 1, wherein said one or more categories are defined in said context database.

3. The method of claim 1, wherein said plurality of attributes comprises a profile image, a profile color, a background color, a profile theme, privacy settings, one or more interests of said user, or a profession of said user.

4. The method of claim 1, wherein said one or more activities correspond to statistical data pertaining to at least one of a number of messages, average messages per day, a count of messages during business hours, messages over weekends, a first tweet time and a last tweet time of a day when a message was sent by said user.

5. The method of claim 4, wherein said second score is determined based on said statistical data associated with said one or more activities of said user.

6. The method of claim 1, further comprising:
identifying one or more keywords in said plurality of words, wherein said one or more keywords are deterministic of at least a human emotion.

7. The method of claim 6, wherein said third score is determined based on a frequency of occurrence of said one or more keywords in said one or more conversations of said user, wherein said one or more keywords are related to at least one of a plurality of psychological types.

8. The method of claim 6, wherein said part of speech is further deterministic of said context of said one or more conversations.

9. The method of claim 6, wherein said human emotion is interpreted based on a lexical database.

10. The method of claim 9, wherein said lexical database comprises a plurality of primary human emotions, wherein each of said plurality of primary human emotions is associated with a plurality of secondary emotions and each of said plurality of secondary emotions is associated with a plurality of tertiary emotions.

11. The method of claim 10, further comprising:
determining, by said one or more processors, a primary human emotion of said plurality of primary human emotions corresponding to a tertiary emotion of said plurality of tertiary emotions, wherein said determination of said primary human emotion is based on said lexical database and one of said plurality of tertiary emotions identified for said each word of said plurality of words.

12. The method of claim 11, wherein said determination of said context of said one or more conversations is based on said primary human emotion corresponding to said tertiary emotion.

13. The method of claim 6, wherein a plurality of look-up tables is utilized to assign a polarity to said human emotion identified from said one or more keywords, wherein said polarity categorizes said human emotion into one of a positive emotion, a negative emotion, or a neutral emotion.

14. The method of claim 13, further comprising:
determining, by said one or more processors, said positive emotion and said negative emotion simultaneously based on one of said one or more conversations and said plurality of look-up tables; and determining a sarcasm as said human emotion in one of said one or more conversations based on said determination of said positive emotion and said negative emotion.

15. The method of claim 14, wherein said third score is determined based on negating said positive emotion with a human emotion opposite in nature to said positive emotion, wherein said negation is based on one of said plurality of look-up tables.

16. The method of claim 1, wherein said context is determined based on identifying at least one of a plurality of persons being referred in at least one of said plurality of words in said one or more conversations of said user.

17. A system for determining a psychological type of a user, the system comprising:
one or more processors to:
assign, based on a personality type indicator, a plurality of weightages to a plurality of attributes associated with a profile of said user on a social media platform;

determine a first score associated with said user based on said assigned plurality of weightages;

determine a second score associated with said user based on one or more activities of said user on said social media platform;

determine a part of speech associated with each word of a plurality of words in one or more conversations of said user on said social media platform, wherein said determination of said part of speech is based on a context database;

categorize said each word of said plurality of words in one or more categories based on said part of speech associated with said each word;

determine context of said one or more conversations based on said categorization;

determine a third score associated with said user based on said context of said one or more conversations;

determine said psychological type of said user based on said first score, said second score, and said third score; and transmit information based on said determined psychological type, wherein said information indicates at least one of promotional offers, advertisements, marketing strategies, or publicity strategies.

* * * * *